US011115962B2

(12) United States Patent
Kang et al.

(10) Patent No.: US 11,115,962 B2
(45) Date of Patent: Sep. 7, 2021

(54) METHOD FOR TRANSMITTING/RECEIVING UPLINK CHANNEL IN WIRELESS COMMUNICATION SYSTEM, AND DEVICE THEREFOR

(71) Applicant: LG Electronics Inc., Seoul (KR)

(72) Inventors: Jiwon Kang, Seoul (KR); Ilmu Byun, Seoul (KR); Hanbyul Seo, Seoul (KR); Minki Ahn, Seoul (KR); Joonkui Ahn, Seoul (KR); Suckchel Yang, Seoul (KR); Sukhyon Yoon, Seoul (KR); Kilbom Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 121 days.

(21) Appl. No.: 16/476,493

(22) PCT Filed: Jan. 3, 2018

(86) PCT No.: PCT/KR2018/000101
§ 371 (c)(1),
(2) Date: Jul. 8, 2019

(87) PCT Pub. No.: WO2018/128376
PCT Pub. Date: Jul. 12, 2018

(65) Prior Publication Data
US 2021/0084640 A1    Mar. 18, 2021

Related U.S. Application Data

(60) Provisional application No. 62/454,000, filed on Feb. 2, 2017, provisional application No. 62/442,951, filed on Jan. 5, 2017.

(51) Int. Cl.
*H04W 72/04*    (2009.01)
*H04B 7/0404*    (2017.01)
*H04L 5/00*    (2006.01)

(52) U.S. Cl.
CPC ...... *H04W 72/0413* (2013.01); *H04B 7/0404* (2013.01); *H04L 5/0048* (2013.01)

(58) Field of Classification Search
CPC ........... H04W 72/0413; H04W 72/046; H04W 72/08; H04L 5/0048; H04B 7/0404
See application file for complete search history.

(56) References Cited

U.S. PATENT DOCUMENTS

2013/0057432 A1    3/2013  Rajagopal et al.
2013/0235742 A1    9/2013  Josiam et al.
(Continued)

FOREIGN PATENT DOCUMENTS

CN    103733542    4/2014
CN    104871464    8/2015
(Continued)

OTHER PUBLICATIONS

CATT, "CSI feedback for beamformed CSI-RS on PUCCH," R1-153945, 3GPP TSG RAN WG1 Meeting #82, Beijing, China, Aug. 24-28, 2015, 4 pages.
(Continued)

*Primary Examiner* — Afshawn M Towfighi
(74) *Attorney, Agent, or Firm* — Fish & Richardson P.C.

(57) ABSTRACT

Disclosed are a method for transmitting and receiving an uplink channel in a wireless communication system and an apparatus therefor. Specifically, a method for transmitting, by a user equipment (UE), an uplink channel may include: receiving a specific reference signal from a base station; determining the number of beams for transmitting an uplink control channel for reporting uplink control information generated based on the specific reference signal; and transmitting, to the base station, the uplink control channel via a single beam or a plurality of beams, in which the number of beams may be determined based on at least one of measure- (Continued)

ment information by a downlink reference signal received by the base station or a type of uplink control information.

13 Claims, 8 Drawing Sheets

(56) References Cited

U.S. PATENT DOCUMENTS

| | | | |
|---|---|---|---|
| 2013/0322358 A1 | 12/2013 | He et al. | |
| 2016/0197659 A1 | 7/2016 | Yu et al. | |
| 2018/0102827 A1* | 4/2018 | Noh | H04L 25/0204 |
| 2018/0263024 A1* | 9/2018 | John Wilson | H04W 72/044 |
| 2019/0109625 A1* | 4/2019 | Subramanian | H04W 72/046 |
| 2019/0199496 A1* | 6/2019 | Qin | H04B 7/0628 |
| 2019/0313273 A1* | 10/2019 | Sharma | H04B 7/0408 |
| 2019/0326971 A1* | 10/2019 | Tang | H04B 7/0695 |
| 2020/0099438 A1* | 3/2020 | Takano | H04W 16/28 |

FOREIGN PATENT DOCUMENTS

| | | |
|---|---|---|
| CN | 105009626 | 10/2015 |
| CN | 105684323 | 6/2016 |
| CN | 106160807 | 11/2016 |
| KR | 1020140016854 | 2/2014 |
| KR | 1020140049712 | 4/2014 |
| KR | 101668709 | 11/2016 |
| WO | WO2018064327 | 4/2018 |

OTHER PUBLICATIONS

Ericsson, "Beam management overview," R1-1612345, 3GPP TSG-RAN WG1 #87, Reno, Nevada, Nov. 14-18, 2016, 6 pages.
Extended European Search Report in European Appln. No. 18736250.4, dated Jul. 31, 2020, 10 pages.
Korean Notice of Allowance in Korean Appln. No. 10-2019-7019512, dated Jan. 21, 2020, 6 pages (with English translation).
Samsung, "Discussion on Network triggered beam reporting," R1-1612512, 3GPP TSG RAN WG1 Meeting #87, Reno, USA Nov. 14-18, 2016, 4 pages.
Samsung, "Discussions on periodic and semi-persistent CSI reporting for NR," R1-1612505, 3GPP TSG RAN WG1 #87, Reno, USA Nov. 14-18, 2016, 5 pages.
ZTE, ZTE Microelectronics, "Discussion on beam recovery mechanism," R1-1611422, 3GPP TSG RAN WG1 Meeting #87, Reno, USA, Nov. 14-18, 2016, 4 pages.
ZTE, ZTE Microelectronics, "Discussion on UL MIMO transmission for NR," R1-1608669, 3GPP TSG RAN WG1 Meeting #86bis, Lisbon, Portugal Oct. 10-14, 2016, 5 pages.
CATT, "Discussion on beam reporting," R1-1611385, 3GPP TSG RAN WG1 Meeting #87, Reno, USA, dated Nov. 5, 2016, 6 pages.
CN Office Action in Chinese Appln. No. 201880012164.2, dated Jul. 2, 2021, 18 pages (with English translation).
Delayen et al., "Design Considerations for high-current superconducting RFQ's." In Proceedings of International Conference on Particle Accelerators, pp. 838-840.
LTE Advanced, "Study on Key Techniques in LTE-Advanced System," Jun. 2013, 172 pages (with English Abstract).

* cited by examiner

[FIG. 1]
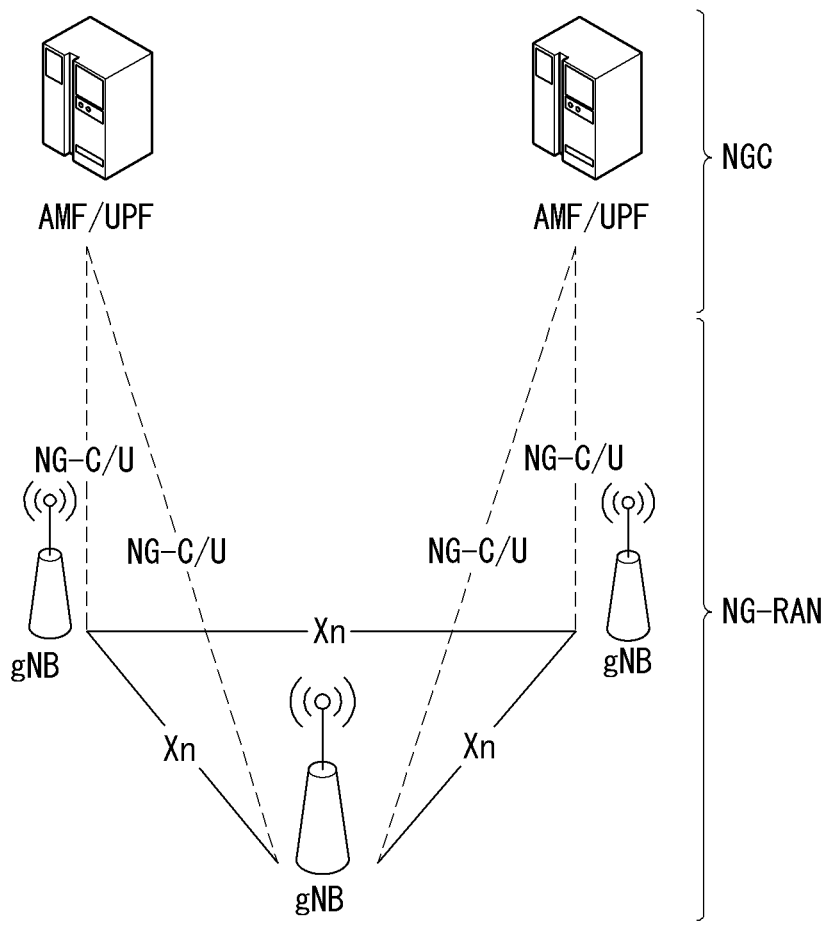
[FIG. 2]
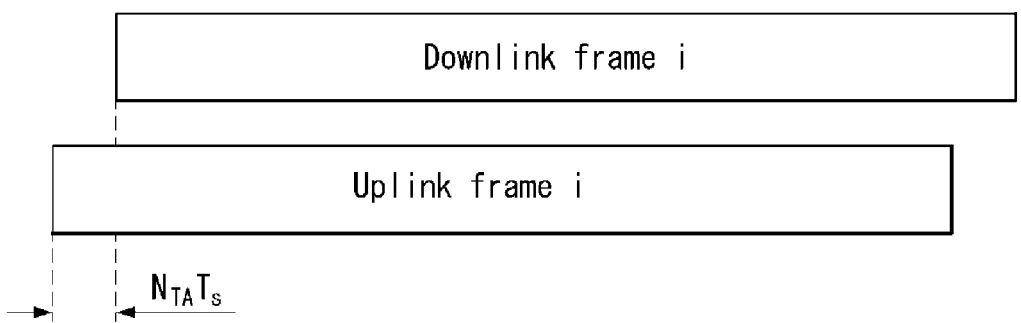

[FIG. 3]
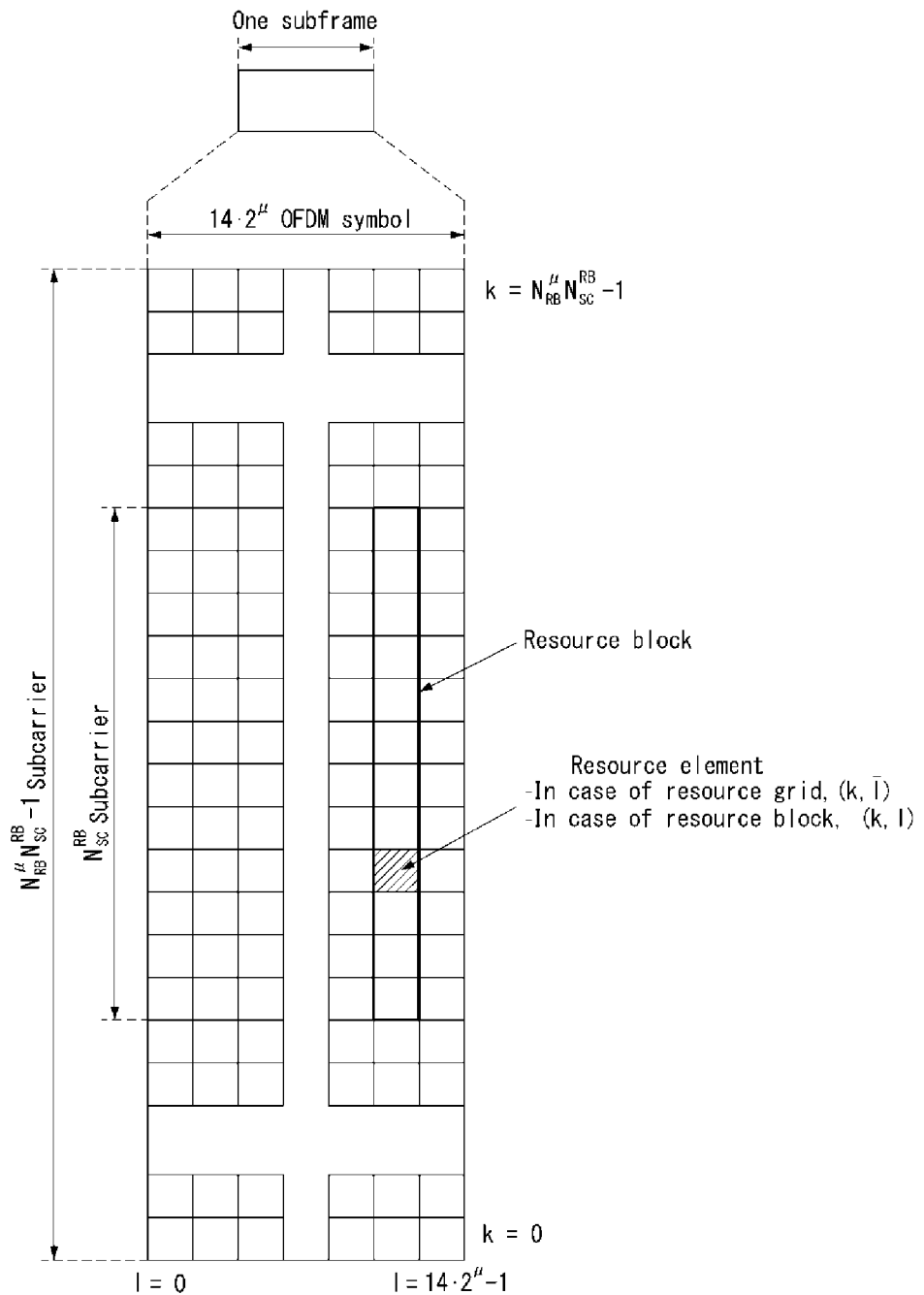

[FIG. 4]
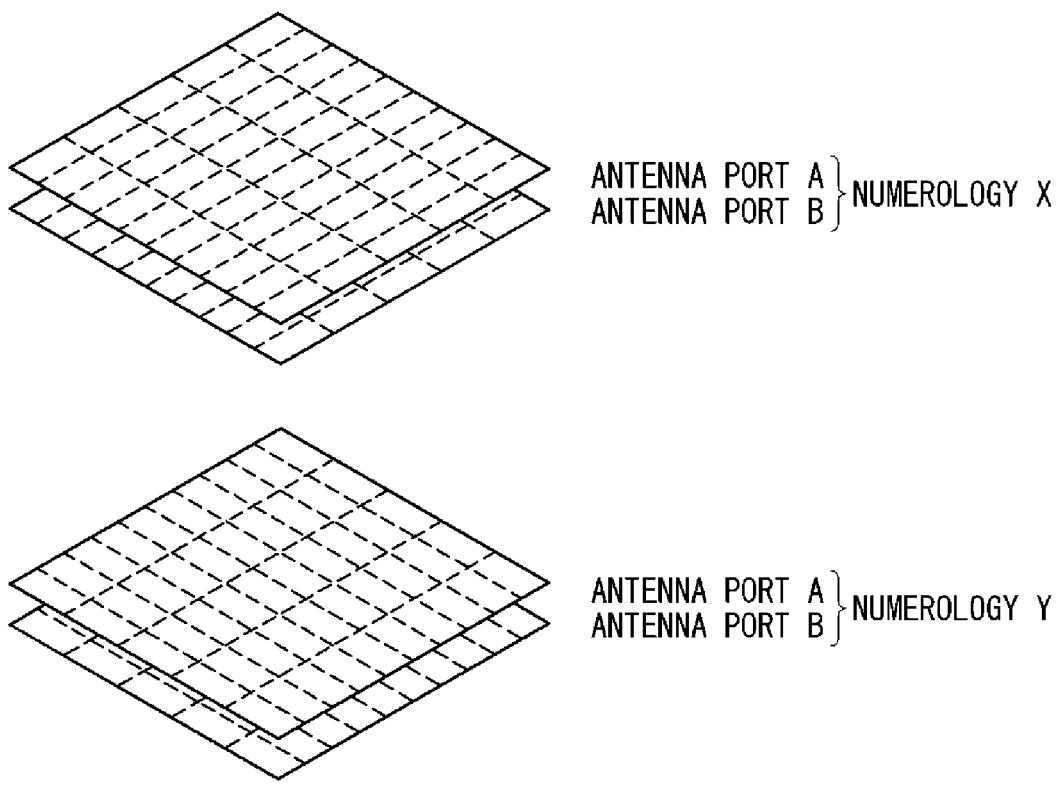

[FIG. 5]
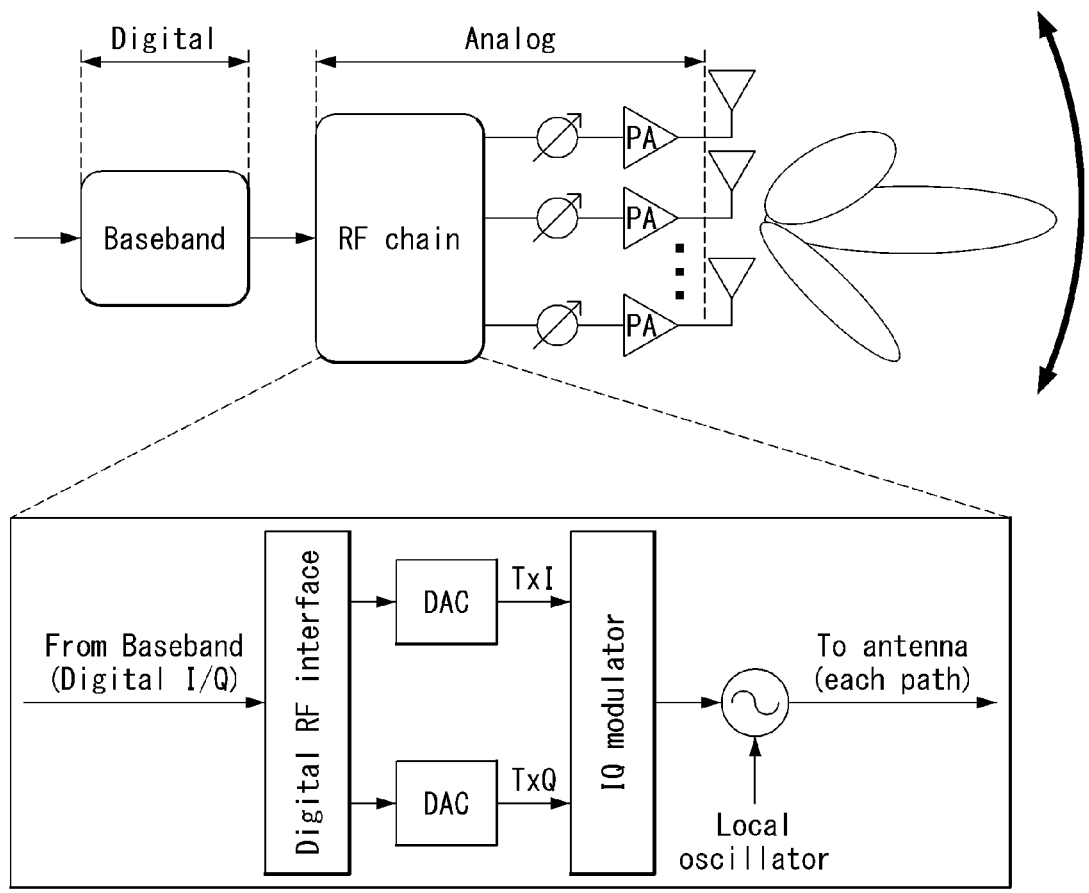

[FIG. 6]
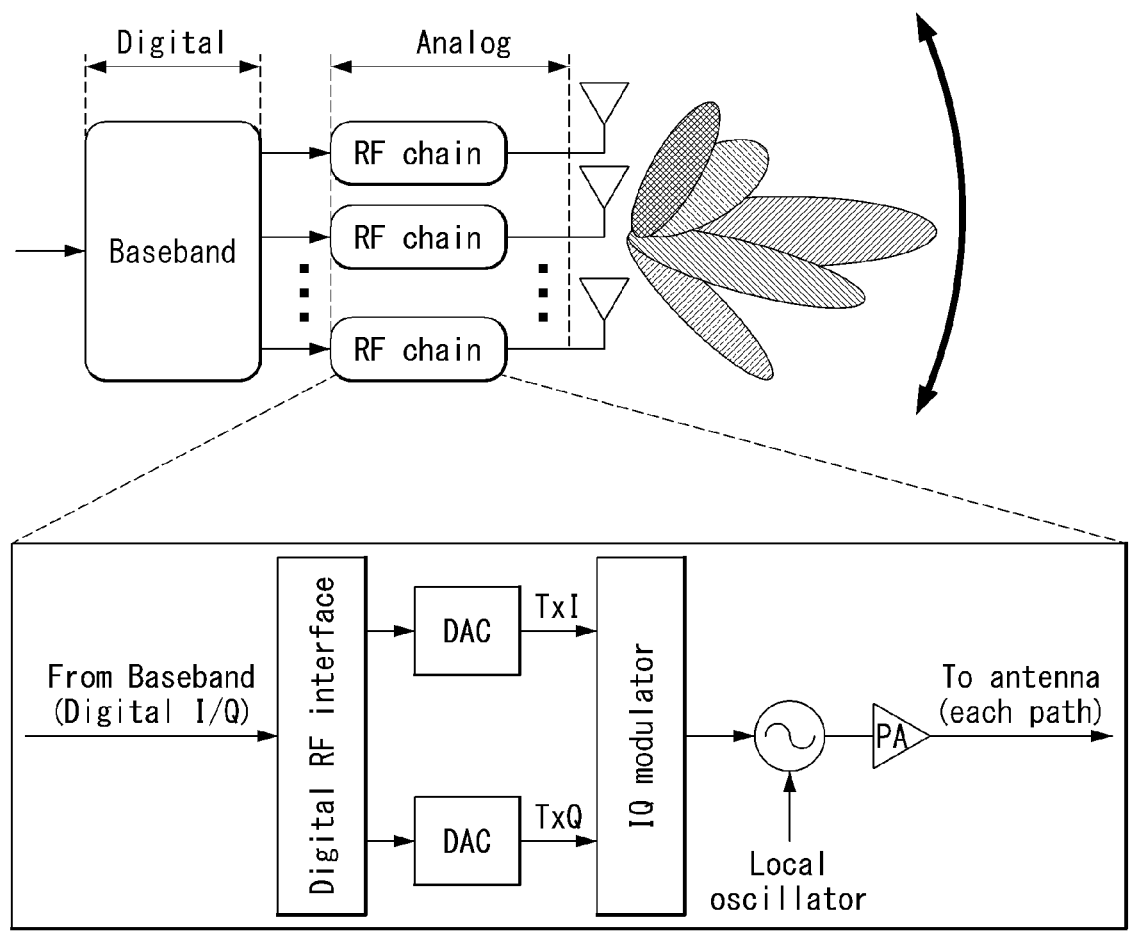

[FIG. 7]
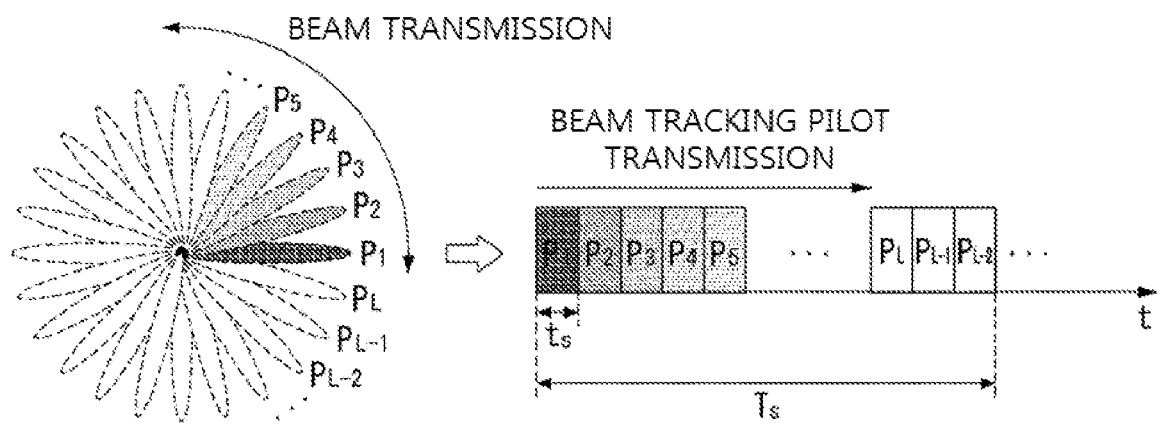
[FIG. 8]
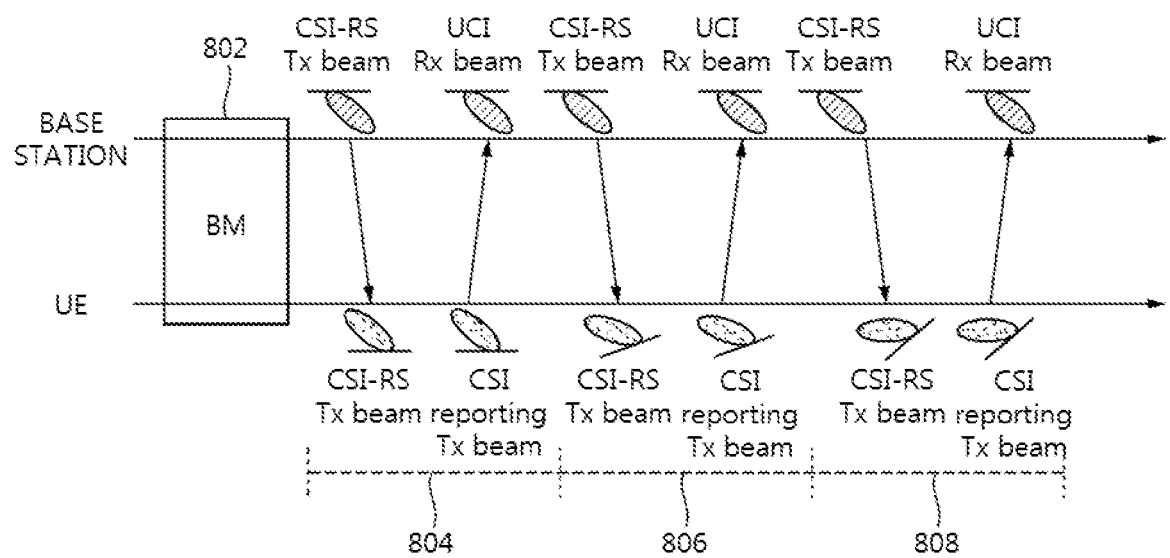

[FIG. 9]
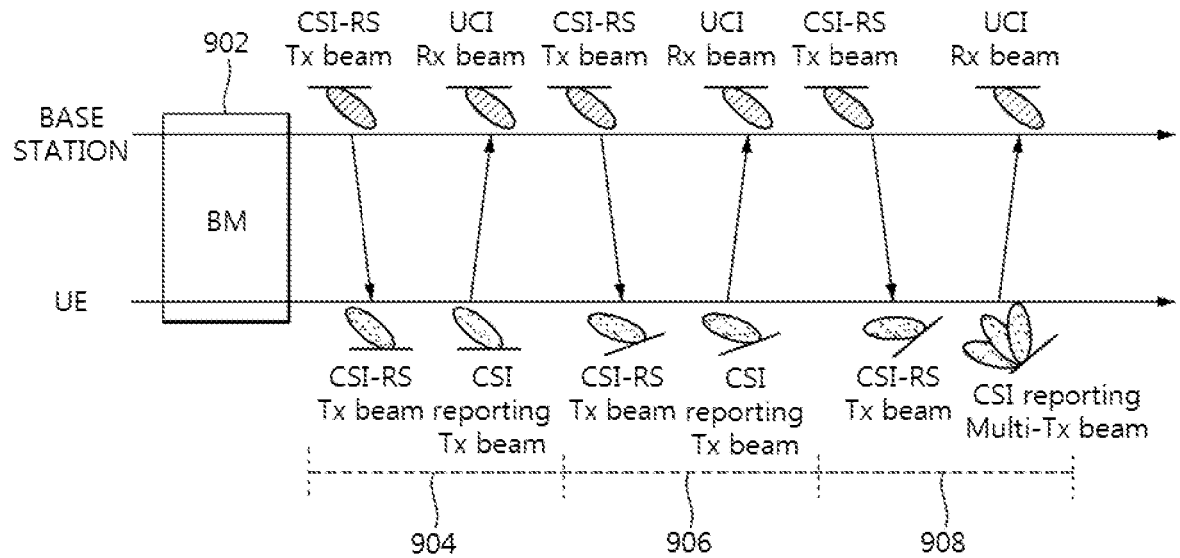
[FIG. 10]
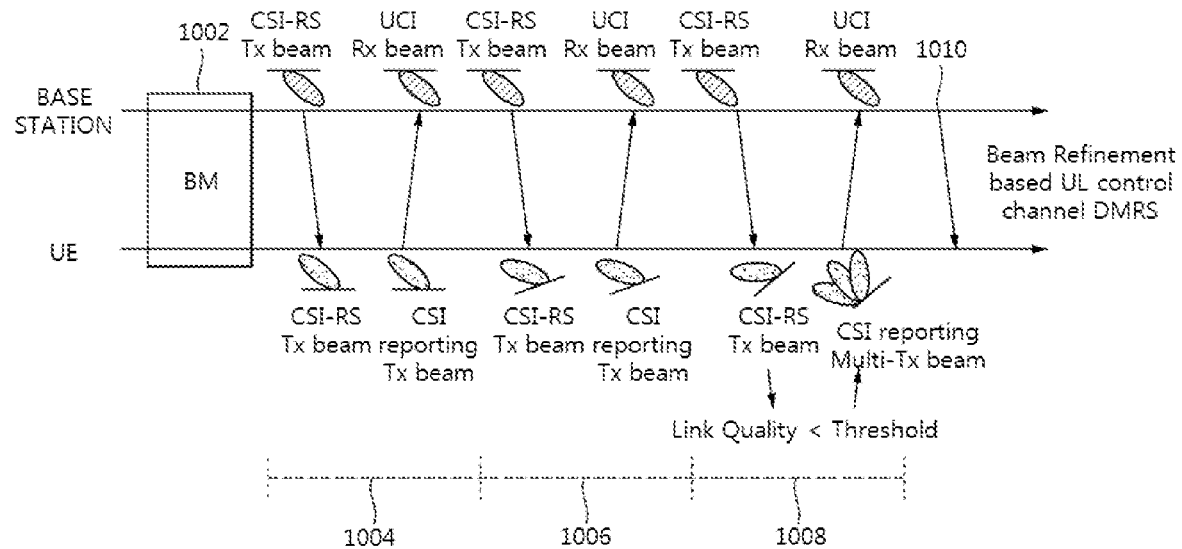

[FIG. 11]
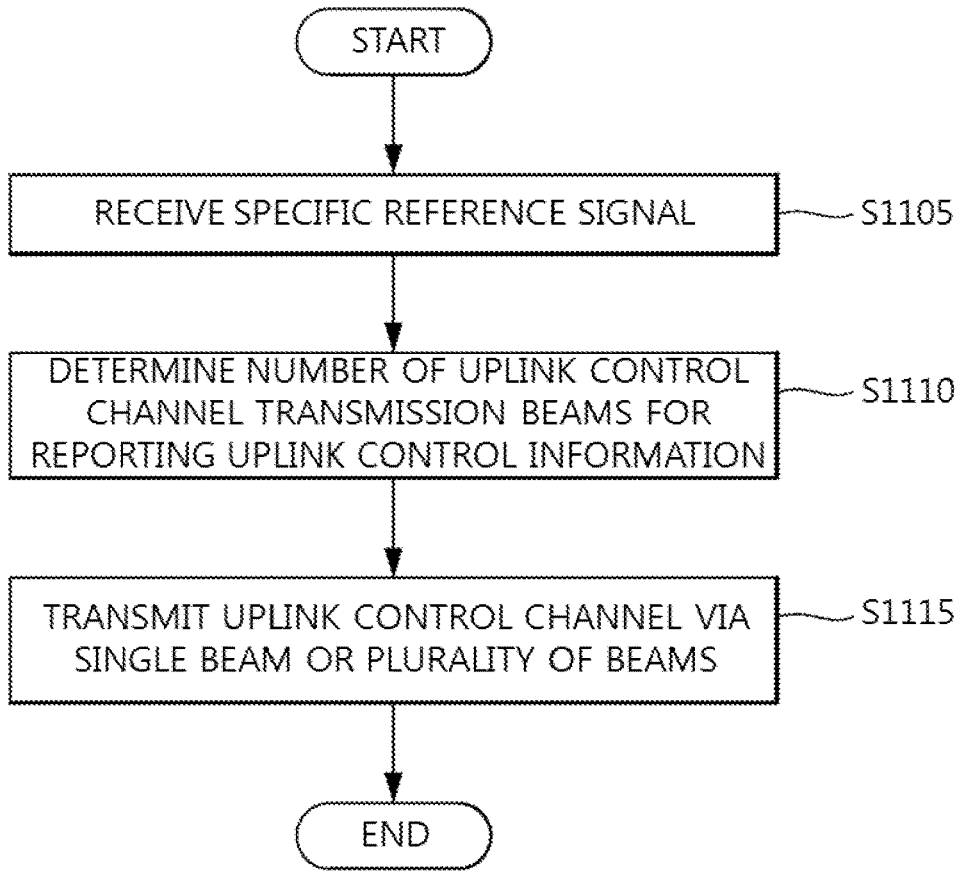
[FIG. 12]
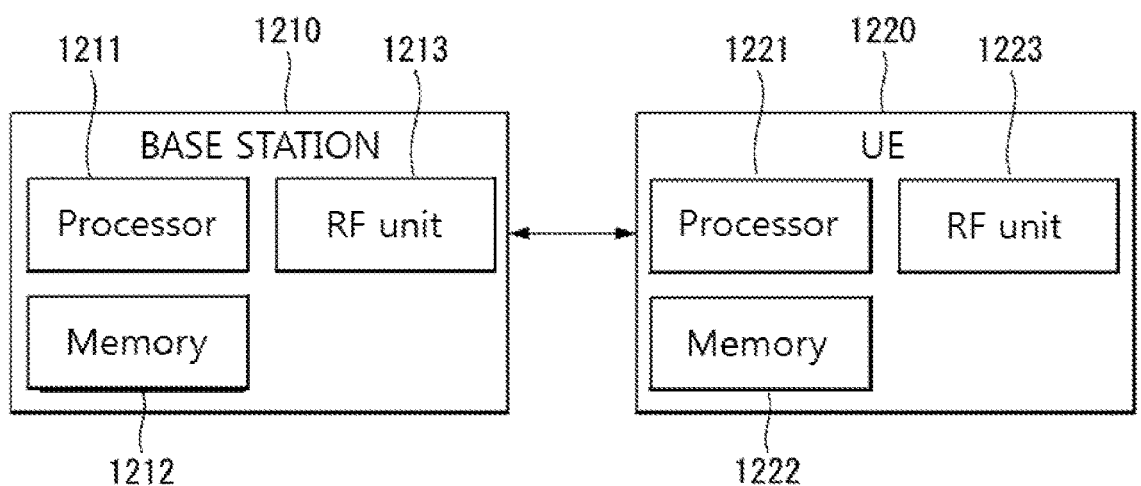

METHOD FOR TRANSMITTING/RECEIVING UPLINK CHANNEL IN WIRELESS COMMUNICATION SYSTEM, AND DEVICE THEREFOR

CROSS-REFERENCE TO RELATED APPLICATIONS

This application is a National Stage application under 35 U.S.C. § 371 of International Application No. PCT/KR2018/000101, filed on Jan. 3, 2018, which claims the benefit of of U.S. Provisional Application No. 62/442,951, filed on Jan. 5, 2017, and U.S. Provisional Application No. 62/454,000, filed on Feb. 2, 2017. The disclosures of the prior applications are incorporated by reference in their entirety.

TECHNICAL FIELD

The present invention relates to a wireless communication system, and more particularly, to a method for transmitting and receiving an uplink channel via one or more beams and an apparatus for supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

This specification proposes a method for transmitting and receiving an uplink channel in a wireless communication system.

Specifically, this specification proposes a method for transmitting, by a user equipment, an uplink channel by using one or more beams.

Further, this specification proposes a method for performing beam refinement based on a reference signal of an uplink control channel.

Further, this specification proposes a method for configuring a transmission beam of an uplink control channel by using beam indication information for transmitting another uplink channel.

The technical objects of the present invention are not limited to the aforementioned technical objects, and other technical objects, which are not mentioned above, will be apparently appreciated by a person having ordinary skill in the art from the following description.

Technical Solution

According to an embodiment of the present invention, a method for transmitting, by a user equipment (UE), an uplink channel in a wireless communication system includes: receiving a specific reference signal from a base station; determining the number of beams for transmitting an uplink control channel for reporting uplink control information generated based on the specific reference signal; and transmitting, to the base station, the uplink control channel via a single beam or a plurality of beams, in which the number of beams is determined based on at least one of measurement information by a downlink reference signal received by the base station or a type of uplink control information.

Further, in the method according to the embodiment of the present invention, when a value represented by the measurement information is smaller than a pre-configured threshold, the uplink control channel may be transmitted via the plurality of beams.

Further, in the method according to the embodiment of the present invention, the pre-configured threshold may be configured differently according to the number of beams of the plurality of beams.

Further, in the method according to the embodiment of the present invention, the downlink reference signal may include a CSI-RS, and the measurement information may include at least one of a channel quality indicator, received power information, or received quality information.

Further, in the method according to the embodiment of the present invention, when the uplink control information may include information representing at least one of a rank indicator or a beam index, the uplink control channel may be transmitted via the plurality of beams.

Further, in the method according to the embodiment of the present invention, when the UE transmits the uplink control channel via the plurality of beams, the plurality of beams may include a specific beam used for reporting the uplink control information at a previous time, and the specific beam may be allocated to a pre-configured specific resource among resources configured for transmitting the uplink control channel.

Further, in the method according to the embodiment of the present invention, when the UE transmits the uplink control channel via the plurality of beams, the plurality of beams may belong to one of a plurality of pre-configured beam sets.

Further, the method according to the embodiment of the present invention may include receiving at least one of information representing whether to apply the plurality of beams, information representing the number of beams, or information representing an index of at least one beam to be used for transmitting the uplink control channel.

Further, the method according to the embodiment of the present invention may further include receiving, from the base station, beam configuration information related to transmission of the uplink control channel, in which the beam configuration information may include first beam configuration information for the single beam and second beam configuration information for the plurality of beams, and each of the first beam configuration information and the second beam configuration information may include at least one of resource information, time offset information, or period information related to the transmission of the uplink control channel.

Further, in the method according to the embodiment of the present invention, the UE may be configured to report the uplink control information periodically or semi-persistently.

Further, the method according to the embodiment of the present invention may further include when receiving beam indication information for an uplink shared channel or a downlink shared channel from the base station, transmitting, by the UE, an uplink control channel for reporting subsequent channel state information by using a beam represented by the beam indication information at a subsequent reporting timing.

Further, the method according to the embodiment of the present invention may further include: receiving, by the UE, signal quality information related to the plurality of beams from the base station when transmitting the uplink control channel via the plurality of beams; and transmitting a subsequent uplink channel via at least one specific beam selected based on the received signal quality information.

Further, in the method according to the embodiment of the present invention, the signal quality information may be determined based on signal quality for each beam measured by a reference signal used for demodulating the uplink control channel, and the signal quality information may include at least one of resource index information of the reference signal or received quality information for the reference signal.

The method according to the embodiment of the present invention may further include transmitting, to the base station, information on at least one of whether to apply the plurality of beams for transmitting the uplink control channel or the number of beams.

According to an embodiment of the present invention, a UE for transmitting an uplink channel in a wireless communication system includes: a Radio Frequency (RF) unit for transmitting and receiving a radio signal; and a processor functionally connected to the RF unit, the processor is configured to receive a specific reference signal from a base station, determine the number of beams for transmitting an uplink control channel for reporting uplink control information generated based on the specific reference signal, and transmit, to the base station, the uplink control channel via a single beam or a plurality of beams, and the number of beams is determined based on at least one of measurement information by a downlink reference signal received by the base station or a type of uplink control information.

Advantageous Effects

According to an embodiment of the present invention, even when a link quality (or beam quality) for uplink channel transmission is degraded, an unnecessary beam recovery procedure and/or link recovery procedure can be prevented by using one or more beams according to a quality degree. Therefore, unnecessary power consumption can be reduced and communication disconnection and delay problems until recovery can be prevented.

Further, according to an embodiment of the present invention, since the number of beams to be used can be set differently according to the importance (or reliability) of information, the uncertainty in communication between a base station and a terminal can be reduced.

Further, according to an embodiment of the present invention, a beam refinement procedure can be performed by using a reference signal included in an uplink control channel. As a result, since beam refinement can be performed without signaling of a separate reference signal required in the existing beam refinement procedure, signaling overhead and communication delay can be reduced.

Advantages which can be obtained in the present invention are not limited to the aforementioned effects and other unmentioned advantages will be clearly understood by those skilled in the art from the following description.

DESCRIPTION OF DRAWINGS

In order to help understanding of the present invention, the accompanying drawings which are included as a part of the Detailed Description provide embodiments of the present invention and describe the technical features of the present invention together with the Detailed Description.

FIG. 1 is a diagram illustrating an example of an overall system structure of NR to which a method proposed in the present specification may be applied.

FIG. 2 illustrates a relationship between an uplink frame and a downlink frame in a wireless communication system to which the method proposed in the present specification may be applied.

FIG. 3 illustrates an example of a resource grid supported in the wireless communication system to which the method proposed in the present specification may be applied.

FIG. 4 illustrates examples of a resource grid for each antenna port and numerology to which the method proposed in this specification may be applied.

FIG. 5 illustrates an example of a block diagram of a transmitter constituted by an analog beamformer and an RF chain.

FIG. 6 illustrates an example of a block diagram of a transmitter constituted by a digital beamformer and an RF chain.

FIG. 7 illustrates an example of an analog beam scanning scheme according to various embodiments of the present invention.

FIG. 8 illustrates an example of a beam staggering phenomenon related to periodic or semi-persistent CSI reporting.

FIG. 9 illustrates an example of a method for transmitting UL control information via a plurality of beams to which the method proposed in this specification may be applied.

FIG. 10 illustrates another example of a method for transmitting UL control information via a plurality of beams to which the method proposed in this specification may be applied.

FIG. 11 illustrates an operation flowchart of a user equipment which transmits an uplink channel in a wireless communication system to which the method proposed in this specification may be applied.

FIG. 12 illustrates a block diagram of a wireless communication device to which methods proposed by this specification may be applied.

MODE FOR INVENTION

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an evolved-NodeB (eNB), generation-NodeB (gNB), a base transceiver system (BTS), or an access point (AP). Furthermore, the terminal may be fixed or may have mobility and may be substituted with another term, such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A/New RAT (NR) is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a cyclic prefix (CP) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | Δf = $2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 3 illustrates an example of a resource grid supported in a wireless communication system to which a method proposed by the present disclosure may be implemented.

Referring to FIG. 3, a resource grid is composed of $N_{RB}^{\mu}N_{sc}^{RB}$ subcarriers in a frequency domain, each subframe composed of 14·2μ OFDM symbols, but the present disclosure is not limited thereto.

In the NR system, a transmitted signal is described by one or more resource grids, composed of $N_{RB}^{\mu}N_{sc}^{RB}$ subcarriers, and $2^{\mu}N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 4, one resource grid may be configured for the numerology μ and an antenna port p.

FIG. 4 illustrates examples of a resource grid for each antenna port and numerology to which the method proposed in this specification may be applied.

Each element of the resource grid for the numerology μ and the antenna port p is indicated as a resource element, and may be uniquely identified by an index pair (k,l). Herein, $k=0, \ldots, N_{RB}^{\mu}N_{sc}^{RB}-1$ is an index in the frequency domain, and $l=0, \ldots, 2^{\mu}N_{symb}^{(\mu)}-1$ indicates a location of a symbol in a subframe. To indicate a resource element in a slot, the index pair (k, l) is used. Herein $l=0, \ldots, N_{symb}^{\mu}-1$.

The resource element (k,l) for the numerology μ and the antenna port p corresponds to a complex value $a_{k,l}^{(p,\mu)}$. When there is no risk of confusion or when a specific antenna port or numerology is specified, the indexes p and μ may be dropped and thereby the complex value may become $a_{k,l}^{(p)}$ or $a_{k,l}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Beam Management

In the NR, beam management is defined as follows.

Beam management: a set of L1/L2 procedures for acquiring and maintaining a set of TRP(s) that may be used for DL and UL transmission and reception and/or UE beams, and includes at least the following contents:

Beam determination: an operation of selecting its own transmission/reception beam by a TRP(s) or a UE.

Beam measurement: an operation of measuring the characteristics of a received beamforming signal by a TRP(s) or a UE.

Beam reporting: an operation of reporting information of a beamformed signal by a UE based on beam measurement.

Beam sweeping: an operation of covering a space region using a beam transmitted and/or received during a time interval according to a predetermined method.

Furthermore, a Tx/Rx beam correspondence in a TRP and a UE is defined as follows.

A Tx/Rx beam correspondence in a TRP is maintained when at least one of the followings is satisfied.

A TRP may determine a TRP reception beam for an uplink reception based on the downlink measurement of a UE for one or more transmission beams of the TRP.

A TRP may determine a TRP Tx beam for downlink transmission based on the uplink measurement of the TRP for one or more Rx beams of the TRP.

A Tx/Rx beam correspondence in a UE is maintained when at least one of the followings is satisfied.

A UE may determine a UE Tx beam for uplink transmission based on the downlink measurement of the UE for the one or more Rx beams of the UE.

A UE may determine a UE reception beam for downlink reception on the basis of the indication of a TRP based on uplink measurement for one or more Tx beams.

The capability indication of UE beam correspondence-related information is supported for a TRP.

The following DL L1/L2 beam management procedure is supported within one or a plurality of TRPs.

P-1: this is used to make possible UE measurement for different TRP Tx beams in order to support the selection of a TRP Tx beam/UE Rx beam(s).

In general, beamforming in a TRP includes intra/inter-TRP Tx beam sweep in different beam sets. For beamforming in a UE, in general, this includes UE Rx beam sweep from different sets of beams.

P-2: this is used so that UE measurement for different TRP Tx beams changes an inter/intra-TRP Tx beam(s).

P-3: UE measurement for the same TRP Tx beam is used to change a UE Rx beam if a UE uses beamforming.

Aperiodic reporting triggered by at least network is supported in the P-1, P-2 and P-3-related operation.

UE measurement based on an RS for beam management (at least CSI-RS) is configured with K (total number of beams) beam. A UE reports the measured results of selected N Tx beams. In this case, N is essentially not a fixed number. A procedure based on an RS for a mobility object is not excluded. Report information includes information indicating measurement quantity for an N beam(s) and N DL transmission beam if at least N<K. In particular, a UE may report a CSI-RS resource indicator (CRI) of N' with respect to K'>1 non-zero-power (NZP) CSI-RS resources.

A UE may be configured as the following higher layer parameters for beam management.

N≥1 reporting setting, M≥1 resource configuration
   Links between reporting setting and resource configurations are established in an agreed CSI measurement configuration.
     CSI-RS-based P-1 and P-2 are supported as resource and reporting setting.
     P-3 may be supported regardless of whether reporting setting is present.
   Reporting setting including at least the following contents
     Information indicating a selected beam
     L1 measurement reporting
     A time domain operation (e.g., aperiodic operation, periodic operation, semi-persistent operation)
     Frequency granularity when several frequency granularities are supported
   Resource setting including at least the following contents
     Time domain operation (e.g., aperiodic operation, periodic operation, semi-persistent operation)
     RS type: at least NZP CSI-RS
     At least one CSI-RS resource set. Each CSI-RS resource set includes K≥1 CSI-RS resources (some parameters of K CSI-RS resources may be the same. For example, a port number, a time domain operation, density and a period)

Furthermore, NR supports the following beam reporting by taking into consideration L groups, that is, L>1.
   Information indicating a minimum group
   Measurement quantity for an N1 beam (L1 RSRP and CSI reporting support (if a CSI-RS is for CSI acquisition))
   If applicable, information indicating NI DL transmission beams Group-based beam reporting, such as that described above, may be configured in a UE unit. Furthermore, the group-based beam reporting may be turned off in a UE unit (e.g., when L=1 or NI=1).

The NR supports that a UE can trigger a mechanism recovering from a beam failure.

A beam failure event occurs when quality of a beam pair link of associated control channels is sufficiently low (e.g., a comparison with a threshold, the timeout of an associated timer). The mechanism recovering from a beam failure (or blockage) is triggered when beam blockage occurs.

A network explicitly configures a UE having a resource for transmitting an UL signal for the purpose of recovery. The configuration of the resources is supported in the place where a base station listens in all or some directions (e.g., random access region).

An UL transmission/resource reporting beam blockage may be located in a PRACH (resource orthogonal to a PRACH resource) and at the same time instance or a time instance (may be configured for a UE) different from that of a PRACH. The transmission of a DL signal is supported so that a UE can monitor a beam in order to identify new potential beams.

The NR supports the beam management regardless of a beam-related indication. When the beam related indication is provided, information regarding a UE side beamforming/receiving procedure used for CIS-RS based measurement may be indicated to the UE through the QCL. As QCL parameters to be supported by the NR, parameters for delay, Doppler, average gain, etc. used in the LTE system and a spatial parameter for beamforming at a receiver is scheduled to be added and the QCL parameter may include angle of arrival (AOA) related parameters in terms of UE reception beamforming and/or angle of departure (AOD) related parameters in terms of base station reception beamforming.

In the NR, the angle of arrival (AOA) related parameters will be collectively referred to as a spatial receive (Rx) parameter. That is, a case where a specific antenna port is QCLed with another antenna port in terms of the spatial Rx parameter is referred to as a case where a receiver receiving two corresponding antenna ports may use the same receiving beam (spatial filter). This is the same as a case where the base station announces to the UE that the same or similar transmission beam is applied at the time of transmitting two corresponding antenna ports in terms of downlink.

The NR supports to use the same or different beams in a control channel and corresponding data channel transmission.

For NR-PDCCH transmission supporting robustness for beam pair link blocking, a UE may be configured to monitor an NR-PDCCH on M beam pair links at the same time. In this case, M≥1 and a maximum value of M may depend on at least a UE capability.

A UE may be configured to monitor an NR-PDCCH on a different beam pair link(s) in different NR-PDCCH OFDM symbols. A parameter related to a UE Rx beam configuration for monitoring an NR-PDCCH on a plurality of beam pair links may be configured by higher layer signaling or a MAC CE and/or is taken into consideration in the discovery space design.

At least the NR supports the indication of space QCL assumption between a DL RS antenna port(s) and a DL RS antenna port(s) for the demodulation of a DL control channel. A candidate signaling method for beam indication for an NR-PDCCH (i.e., configuration method of monitoring an NR-PDCCH) is MAC CE signaling, RRC signaling, DCI signaling, a spec. transparent and/or implicit method, and a combination of these signaling methods.

For the reception of a unicast DL data channel, the NR supports the indication of space QCL assumption between a DL RS antenna port and the DMRS antenna port of a DL data channel.

Information indicating an RS antenna port is indicated through DCI (downlink permission). Furthermore, the information indicates an RS antenna port QCLed with a DMRS antenna port. A different set of DMRS antenna ports for a DL data channel may be indicated as QCL with respect to a different set of RS antenna ports.

A UL (PUCCH/PUSCH) beam indication will be described in brief. Here, the UL beam indication is a general term and in the UL beam indication in the NR, a UL beam is indicated by configuring a spatial_relation_info. field.

The spatial_relation_info. field may include an SRS resource ID(s) (SRI) when an SRS based UL beam pair determining procedure is performed and include a CSI-RS resource ID(s) (CRI) or a synchronization signal block (SSB) ID (or another ID corresponding to the SSB ID, e.g., PBCH DMRS ID) which is a DL RS for indicating the DL beam when there is beam reciprocity (or beam correspondence) between the DL beam and the UL beam.

As an example for the UL beam indication for the PUCCH may (1) indicate one SRI, CRI, or SSB ID by configuring the spatial_relation_info. field in the RRC layer or (2) indicate the UL beam by a scheme of configuring a plurality of SRIs, CRIs or SSB IDs in the RRC layer and then, designating one ID among the configured IDs in the MAC layer.

Here, the case of (2) has a feature that a plurality of spatial_relation_info. fields are configured in the RRC layer.

Further, the UL beam indication for the PUSCH is also similar to the UL beam indication for the PUCCH, but a difference between the UL beam indication for the PUSCH and the UL beam indication for the PUCCH is that since SRS transmission is to be performed (through a tailored UL beam pair) for UL link adaptation even after UL beam pair determination ends, a final PUSCH beam indication indicates the corresponding SRS resource ID (SRI) by the DCI.

In this case, the corresponding SRI serves to indicate one of a plurality of SRS resource IDs preconfigured in the higher layer and each of the SRS resource IDs may be beam-configured as the spatial_relation_info. field with CRI, SSB ID, or SRI (for beam management).

Further, the NR supports semi-persistent CSI reporting by the PUSCH as well as the PUCCH.

In this case, in order to perform the semi-persistent CSI reporting by the PUSCH, a scheduling grant is indicated through a separate RNTI apart from a C-RNTI used for performing general one-shot-scheduling similarly to a semi-persistent scheduling (SPS) PUSCH resource allocation scheme.

In this case, the RNTI is configured as an RRC message.

Table 4 below shows one example f a PUCCH beam indication related RRC parameter and Table 5 shows one example of a PUCCH beam indication related MAC CE parameter.

dynamically indicate one of candidates of a plurality of QCL reference resources (e.g., CSI-RS resources or SSB resources) configured in the higher layer similarly to a PQI field of LTE.

Here, the QCL indication may include a QCL indication for a spatial parameter. For example, it may be indicated by which DL RS beam the corresponding PDSCH is transmitted through the TCI field among a plurality of DL RS resources configured in the higher layer.

The UE that receives the indication may receive a corresponding PDSCH beam by applying a reception beam previously trained to be suitable for receiving the corresponding DL RS.

Hybrid Beamforming

The existing beamforming technology using multiple antennas may be divided into an analog beamforming scheme and a digital beamforming scheme depending on the location where a beamforming weight vector/precoding vector is applied.

The analog beamforming scheme is a beamforming scheme applied to an initial multiple antenna structure. This may mean a scheme for branching an analog signal on which digital signal processing has been completed into a plurality

TABLE 4

| Parameter name in specification | Parameter name in text | Description | Value range |
|---|---|---|---|
| PUCCH-SpatialRelationInfo | PUCCH-SpatialRelationInfo | List of configurations of the spatial relation between a reference RS and PUCCH. Reference RS can be SSB/CSI-RS/SRS. If the list has more than one element, MAC-CE selects a single element. | Each element of the list is an SSB Index, NZP-CSI-RS-ResourceConfigId, or SRS-ResourceConfigId |

TABLE 5

| Parameter Name | Description | Size/format |
|---|---|---|
| PUCCH-SpatialRelationInfo | Provides the spatial relation for a PUCCH resource | PUCCH resource ID | Bitmap of size [8] (Bitmap activates one of the [8] entries within the RRC parameter PUCCH-Spatial-relation-info) |

In addition, in the PUCCH to which a single beam is applied and the PUCCH to which a plurality of beams are applied, N beams are determined for a plurality of PUCCH resources (or symbol groups) repeatedly transmitted N times in one slot, respectively.

In this case, a configuration of the beams may be distinguished into respective N beams may be configured (or indicated or applied) as the same beam or configured as different beams.

For example, the spatial_relation_info. field may be configured/indicated in each of a plurality of PUCCH resources repeatedly transmitted in one slot and in this case, whether the same spatial_relation_info value is applied or whether the same spatial_relation_info value is configured similarly or differently for each PUCCH symbol group of one PUCCH resource transmitted in one slot may be distinguished.

In the case of the PUSCH, the PUSCH resources may be repeatedly transmitted in units of a symbol group and it may be distinguished according to whether the same SRI value is applied to different symbol groups.

Further, in the NR system, a transmission configuration indicator (TCI) field included in a DL related DCI serves to of paths and forming a beam by applying a phase shift (PS) and power amplifier (PA) configuration to each path.

For analog beamforming, there is a need for a structure in which the PA and PS connected to each antenna process an analog signal derived from one digital signal. In other words, the PA and PS of an analog stage process a complex weight.

FIG. 5 shows an example of a block diagram of a transmitter configured with an analog beamformer and RF chains. FIG. 2 is merely for convenience of description and does not limit the range of the present invention.

In FIG. 5, the RF chain means a processing block in which a baseband (BB) signal is converted into an analog signal. In the analog beamforming scheme, the accuracy of a beam is determined depending on the characteristics of a PA and PS. The analog beamforming scheme may be advantageous in narrowband transmission in terms of control of the devices.

Furthermore, the analog beamforming scheme has a relatively small multiplexing gain for a transfer rate increase because it is configured with a hardware structure that is difficult to implement multiple stream transmission. Furthermore, in this case, beamforming for each orthogonal resource allocation-based terminal may not be easy.

In contrast, in the digital beamforming scheme, in order to maximize diversity and a multiplexing gain in a MIMO environment, beamforming is performed in a digital stage using a baseband (BB) process.

FIG. 6 shows an example of a block diagram of a transmitter configured with a digital beamformer and RF chains. FIG. 3 is merely for convenience of description and does not limit the range of the present invention.

In the case of FIG. 6, beamforming may be performed as precoding is performed in a BB process. In this case, an RF chain includes a PA. The reason for this is that in the digital beamforming scheme, a complex weight derived for beamforming is directly applied to transmission data.

Furthermore, multiple user beamforming may be supported at the same time because different beamforming may be performed for each terminal. Furthermore, the flexibility of scheduling is improved because independent beamforming is possible for each terminal to which an orthogonal resource has been allocated. Accordingly, an operation of a transmitter complying with a system object is possible. Furthermore, in the environment in which wideband transmission is supported, if a technology, such as MIMO-OFDM, is applied, an independent beam may be formed for each subcarrier.

Accordingly, the digital beamforming scheme can maximize a maximum transfer rate of one terminal (or user) based on a capacity increase of a system and an enhanced beam gain. In the existing 3G/4G (e.g., LTE(-A)) system, the digital beamforming-based MIMO scheme has been introduced based on characteristics, such as those described above.

In an NR system, a massive MIMO environment in which transmission and reception antenna greatly increases may be taken into consideration. In general, in cellular communication, a maximum of transmission and reception antennas applied to the MIMO environment is assumed to be 8. However, as a massive MIMO environment is taken into consideration, the number of transmission and reception antennas may be increased to tens of or hundreds of transmission and reception antennas.

In this case, in the massive MIMO environment, if the above-described digital beamforming technology is applied, a transmitter needs to perform signal processing on hundreds of antennas through a BB process for digital signal processing. Accordingly, the complexity of the signal processing may be greatly increased, and the complexity of a hardware implementation may be greatly increased because RF chains corresponding to the number of antennas are necessary.

Furthermore, the transmitter requires independent channel estimation for all the antennas. Furthermore, in the case of the FDD system, pilot and/or feedback overhead may excessively increase because the transmitter requires feedback information for massive MIMO channels configured with all the antennas.

In contrast, in the massive MIMO environment, if the above-described analog beamforming technology is applied, the hardware complexity of the transmitter is relatively low.

In contrast, an increment of performance using multiple antennas is very small, and the flexibility of resource allocation may be reduced. In particular, upon wideband transmission, to control a beam for each frequency is not easy.

Accordingly, in the massive MIMO environment, only one of the analog beamforming and digital beamforming schemes is not exclusively selected, but a hybrid type transmitter configuration method in which analog beamforming and digital beamforming structures have been combined is necessary.

In this case, a hybrid type transmitter may be configured using the relation between a performance gain and complexity of the analog beamforming scheme and the digital beamforming scheme, such as that shown in Table 1.

Analog Beamforming

In general, the analog beamforming may be used at a pure analog beamforming transceiver and at a hybrid beamforming transceiver. In this case, the analog beam scanning may perform estimation for one beam at the same time. Thus, a beam training time required for beam scanning is proportional to the total number of candidate beams.

As described above, in the case of the analog beamforming, a beam scanning process in the time domain is particularly required for the transceiver beam estimation. In this case, an estimated time $T_s$ for all transmission/reception beams may be expressed as Equation 2 below.

$$T_S = t_s \times (K_T \times K_R) \qquad \text{[Equation 2]}$$

In Equation 2, $t_s$ denotes a time required for scanning one beam, $K_T$ denotes the number of transmission beams, and $K_R$ denotes the number of reception beams.

FIG. 7 illustrates an example of an analog beam scanning scheme according to various embodiments of the present invention. FIG. 7 is just for convenience of the description and does not limit the scope of the present invention.

In the case of FIG. 7, it is assumed that the total number $K_T$ of transmission beams is L and the total number $K_R$ of reception beams is 1. In this case, since the total number of candidate beams is L, the L time intervals are required in the time domain.

In other words, since only one beam may be estimated in a single time interval for the analog beam estimation, as illustrated in FIG. 7, L time intervals are required to estimate all L beams Pi to PL. After the analog beam estimation procedure ends, the UE feeds back an identifier (e.g., ID) of a beam having a highest signal strength to the base station. That is, as the number of transmission/reception antennas increases, the number of individual beams increases, and as a result, a longer training time may be required.

Since the analog beamforming changes a size and a phase angle of a continuous waveform in the time domain after a digital-to-analog converter (DAC), training intervals for individual beams need to be guaranteed unlike the digital beamforming. Therefore, as the length of the training interval increases, efficiency of the system may decrease (i.e., loss of the system may increase).

Channel State Information Feedback

In most cellular systems including a legacy LTE system, the UE receives a pilot signal (e.g., a reference signal (RS)) for channel estimation from the base station, calculates the channel state information (CSI), and reports the calculated value to the base station. The base station transmits a data signal (i.e., downlink data) based on the CSI fed back from the UE. In the case of the LTE system, the CSI fed back by the UE includes channel quality information (CQI), a precoding matrix index (PMI), and a rank indicator (RI). Hereinafter, CQI feedback, PMI feedback, and RI feedback will be described in detail.

First, the CQI feedback is radio channel quality information which the UE provides to the base station in order to provide information on what modulation and coding scheme (MCS) is to be applied when transmitting data. When a radio quality between the base station and the UE is high, the UE feeds back a high CQI value to the base station. The base station that is fed back the high CQI value transmits data by applying a relatively high modulation order and a low channel coding rate. Unlike this, when the radio quality between the base station and the UE is low, the UE feeds back a low CQI value to the base station. The base station that is fed back the low CQI value transmits data by applying a relatively low modulation order and a high channel coding rate.

Next, the PMI feedback is preferred precoding matrix information which the UE provides to the base station in order to provide information on which Multiple-Input Multiple-Output (MIMO) precoding scheme is to be applied when the base station installs multiple-antennas. The UE estimates a downlink MIMO channel between the base station and the UE from a pilot signal and delivers information on which MIMO precoding the base station applies more efficiently through the PMI feedback. In the LTE system, only linear MIMO precoding which may be expressed in a matrix form is considered in the PMI configuration.

In this case, the base station and the UE share a codebook constituted by a plurality of precoding matrices and each MIMO precoding matrix in the codebook has a unique index. Accordingly, the UE minimizes a feedback information amount of the UE by feeding back an index corresponding to a most preferred MIMO precoding matrix in the codebook through the PMI. In this case, the PMI value need not particularly be constituted only by one index. As an example, when the number of transmission antenna ports is 8, two indices (i.e., a first PMI and a second PMI) are combined to derive a final 8 Tx (Transmission) MIMO precoding matrix.

Next, the RI feedback is information on the number of preferred transmission layers which the UE provides to the base station in order to provide information on the number of transmission layers preferred by the UE when multi-layer transmission is possible through spatial multiplexing by installing multiple antennas by the base station and the UE. In this case, the RI has a close relationship with the PMI because the base station must know what precoding is to be applied to each layer according to the number of transmission layers.

In the PMI/RI feedback configuration, a method may be considered in which the PMI codebook is configured based on single layer transmission and then, the PMI is defined for each layer and fed back by the UE. However, such a method has a disadvantage that the amount of information of the PMI/RI feedback greatly increases as the number of transmission layers increases. Therefore, in the LTE system, the PMI codebook is defined according to the number of respective transmission layers. That is, for R-layer transmission, N matrices of size NtxR are defined in the codebook. Here, R represents the number of layers, Nt represents the number of transmission antenna ports, and N represents the size of the codebook. Therefore, in the LTE system, the size of the PMI codebook is defined regardless of the number of transmission layers. In this case, R, the number of transmission layers coincides with a rank value of the precoding matrix (NtxR matrix).

The PMI/RI described in this specification means PMI/RI in the LTE system, which means an index value of the precoding matrix (NtxR matrix) and a rank value of the precoding matrix and is not limited. Further, the PMI described in this specification means information representing preferred MIMO precoder information among MIMO precoders applicable in a transmitter. In this case, a form of the precoder is not limited only to a linear precoder which may be expressed by a matrix. In addition, the RI described in this specification which includes all of the feedback information representing the number of preferred transmission layers may be appreciated as a wider meaning than the RI in the LTE.

Such CSI information may be generated for the entire system frequency domain or may be generated for a partial frequency domain. In particular, in a wideband (or broadband) system, a method may be useful which generate and feed back the CSI information for the partial frequency domain (e.g., subband) preferred for each UE.

Further, in the LTE system, the feedback for the CSI information is performed through the uplink channel. In general, periodic CSI feedback is performed through the Physical Uplink Control Channel (PUCCH) and aperiodic CSI feedback is performed through the Physical Uplink Shared Channel (PUSCH).

A PUCCH CSI reporting mode for the periodic CSI feedback performed through the PUCCH may be defined as shown in Table 6. Here, the PUCCH CSI reporting mode means distinguishing what information the UE should feed back by a mode when the UE performs the periodic CSI feedback.

TABLE 6

| | | PMI Feedback Type | |
|---|---|---|---|
| | | No PMI (OL, single-antenna) | Single PMI (CL) |
| CQI Feedback Type | Wideband | Mode 1-0<br>RI<br>One wideband CQI(4 bit)<br>When RI > 1, CQI of first codeword | Mode 1-1<br>RI<br>Wideband CQI(4 bit)<br>Wideband spatial CQI(3 bit) for RI > 1<br>Wideband PMI(4 bit) |
| | UE selected | Mode 2-0<br>RI<br>Wideband CQI(4 bit)<br>Best-1 CQI(4 bit) in each BP<br>Best-1 indicator(L-bit label)<br>When RI > 1, CQI of first codeword | Mode 2-1<br>RI<br>Wideband CQI(4 bit)<br>Wideband spatial CQI(3 bit) for RI > 1<br>Wideband PMI(4 bit)<br>Best-1 CQI(4 bit) in each BP<br>Best-1 spatial CQI(3 bit) for RI > 1<br>Best-1 indicator(L-bit label) |

Unlike the periodic CSI feedback, the aperiodic CSI feedback is temporarily performed only when the base station requests the CSI feedback information. In this case, the base station triggers the aperiodic CSI feedback through a downlink control channel such as a Physical Downlink Control Channel (PDCCH)/enhanced PDCCH (ePDCCH). When the aperiodic CSI feedback is triggered in the LTE system, a PUSCH CSI reporting mode as to what information the UE should feed back may be defined as shown in Table 7. In this case, the PUSCH CSI reporting mode in which the UE will operate may be indicated through a higher layer signaling (i.e., a higher layer message).

now. When data is transmitted/received using a multi-input/output antenna, a channel state between the transmitting antenna and the receiving antenna must be detected to correctly receive the signal. Accordingly, respective transmitting antennas need to have individual reference signals.

TABLE 7

| | | PMI Feedback Type | |
|---|---|---|---|
| | | No PMI (OL, TD, single-antenna) | With PMI (CL) |
| PUSCH CQI feedback type | Wideband (Wideband CQI) | | Mode 1-2: Multiple PMI<br>RI $1^{st}$ wideband CQI(4 bit)<br>$2^{nd}$ wideband CQI(4 bit) if RI > 1<br>Subband PMIs on each subband |
| | UE Selected (subband CQI) | Mode 2-0<br>RI (only for Open-loop SM)<br>Wideband CQI(4 bit) + Best-M CQI(2 bit)<br>Best-M index<br>When RI > 1, CQI of first codeword | Mode 2-2: Multiple PMI<br>RI $1^{st}$ wideband CQI(4 bit) + Best-M CQI (2 bit)<br>$2^{nd}$ wideband CQI(4 bit) + Best-M CQI(2bit) if RI > 1<br>Wideband PMI/Best-M PMI Best-M index |
| | Higher layer-configured (subband CQI) | Mode 3-0<br>RI (only for Open-loop SM)<br>widebandCQI(4 bit) + subbandCQI(2 bit)<br>When RI > 1, CQI of first codeword | Mode 3-1: Single PMI<br>RI $1^{st}$ wideband CQI(4 bit) + subband CQI (2 bit)<br>$2^{nd}$ wideband CQI(4 bit) + subband CQI (2 bit) if RI > 1<br>Wideband PMI |

Since the amount of data that PUCCH may transmit at one time (i.e., payload size) is smaller than PUSCH, it may be difficult to transmit CSI information to be transmitted at one time in case of the PUCCH. As a result, a timing (e.g., subframe) of transmitting the CQI and the PMI and a timing of transmitting the RI may be configured differently depending on each PUCCH CSI reporting mode. For example, in the case of Mode 1-0 of Table 4, the UE may transmit only the RI at a specific PUCCH transmission timing and transmit a wideband CQI at another PUCCH transmission timing.

Further, a PUCCH reporting type may be defined according to a type of CSI information configured at the specific PUCCH transmission timing. For example, a reporting type in which only the RI is transmitted corresponds to type 3 and a reporting type in which only the wideband CQI is transmitted corresponds to type 4. A feedback period and an offset value for the RI and the feedback period and the offset value for the CQI/PMI may be indicated (or configured) to the UE via the higher layer signaling (i.e., higher layer message).

The CSI feedback information described above is included in uplink control information (UCI).

Reference Signal (RS)

In a wireless communication system, since data is transmitted over a wireless channel, the signal may be distorted during transmission. In order to correctly receive the distorted signal at a receiving end, the distortion of the received signal must be corrected using channel information. In order to detect the channel information, a method for transmitting a signal known to both a transmitting side and a receiving side and a method for detecting the channel information using a degree of distortion when a signal is transmitted through a channel are mainly used. The above-mentioned signal is referred to as a pilot signal or a reference signal (RS).

Further, in recent years, in most mobile communication systems, when transmitting a packet, a method is used, which may enhance transmission and reception data efficiency by adopting multiple transmitting antennas and multiple receiving antennas by emerging from use of one transmitting antenna and one receiving antenna used up to In the case of the LTE system, the purpose of the pilot signal or RS may be defined as four types as follows.

(1) Measurement RS: Pilot for measuring channel state
 1) CSI measurement/reporting purpose (short term measurement): purpose such as link adaptation, rank adaptation, closed loop MIMO precoding, etc.
 2) Long term measurement/reporting purpose: purpose such as handover, cell selection/reselection, etc.
(2) Demodulation RS: pilot for receiving physical channel
(3) Positioning RS: pilot for estimating UE position
(4) Multicast-Broadcast Single-Frequency Network Reference Signal (MBSFN RS): pilot for Multicast)/Broadcast service The RS in the mobile communication system may be largely categorized into two types. There are an RS for the purpose of channel information acquisition and an RS used for data demodulation. Since the object of the former reference signal is to enable a UE (user equipment) to acquire downlink channel information, the former reference signal should be transmitted on broadband and even the UE that does not receive data in a specific subframe should be able to receive and measure the RS. Further, the former RS is also used for measurement of handover, etc. The latter RS is an RS transmitted together when the base station transmits DL data. The UE may perform channel estimation by receiving the corresponding RS, thereby demodulating data. The RS should be transmitted to a region to which the data is transmitted.

In this case, in order to an RS overhead problem caused by an increase in the number of antennas, Channel State Information-RS (CSI-RS) may be used as RS for obtaining channel information and UE-specific RS may be used as RS used for data demodulation. The CSI-RS is an RS designed specially for CSI measurement and feedback and has a very low RS overhead compared to a Cell-Specific Reference Signal (CRS). Further, the CRS supports four multiple antenna ports, while the CSI-RS is designed to support up to 8 multiple antenna ports.

Further, the UE-specific RS is designed specially for demodulation of the data channel, and as a result, unlike the CRS, the UE-specific RS is RS (i.e., precoded RS) in which an MIMO precoding technique applied when transmitting data to the corresponding UE is applied to a pilot signal. Therefore, the UE-specific RSs need to be only transmitted by the number of transmission layers (i.e., transmission ranks), and need not be transmitted by the number of antenna ports, such as the CRS and the CSI-RS. Further, since the UE-specific RS is transmitted for receiving the data channel of the corresponding UE in a resource region which is the same as a data channel resource region allocated to each UE through a scheduler of the base station, it is characterized in that the UE-specific RS is RS specific to the UE.

Further, in LTE uplink, sounding RS (SRS) exists as measurement RS, and each of a demodulation RS (DMRS) for demodulation for the uplink data channel (PUSCH) and a demodulation RS for the uplink control channel (PUCCH) for ACK/NACK and CSI feedback exists.

Further, in the case of the NR system, a Phase-Tracking Reference Signal (PTRS) for measuring and tracking a change of a phase may additionally exist.

The base station may request periodic CSI reporting, semi-persistent CSI reporting, and/or aperiodic CSI reporting to the UE. Here, the semi-persistent CSI reporting may mean that the periodic CSI reporting is activated only during a specific time interval. In this case, in a duration in which the periodic CSI reporting and the semi-persistent CSI reporting are activated, a UL resource (e.g., PUCCH) for the CSI reporting is allocated to the UE at a specific period.

For CSI measurement of the UE, the base station needs to transmit a downlink (DL) reference signal (DL RS). In the case of a system to which beamforming (e.g., analog beamforming) is applied, a downlink transmission/reception beam pair (DL Tx/Rx beam pair) for transmission/reception of the DL RS needs to be determined (or configured). In addition, an UL transmission and reception beam pair (UL Tx/Rx beam pair) for transmission/reception of UL control information (e.g., HARQ-ACK information, CSI) needs to be determined. Hereinafter, for convenience of description in this specification, the DL transmission and reception beam pair is referred to as a DL beam pair and the UL transmission and reception beam pair is referred to as a UL beam pair.

A procedure for determining the DL beam pair may be configured by combining procedures of two following steps. Specifically, one of the procedures of the two steps is a procedure (i.e., a base station transmission beam selecting procedure) in which the base station transmits to the UE DL RSs corresponding to a plurality of base station transmission beams (i.e., TRP transmission beams) and the corresponding UE selects and/or reports one of the plurality of base station transmission beams. Further, the remaining procedure is a procedure in which the base station repeatedly transmits the same DL RS corresponding to each base station transmission beam and the UE performs measurement for repeatedly transmitted signals by using different UE Rx beams and selects (or determines) the UE Rx beam according to the measurement.

Similarly thereto, a procedure for determining the UL beam pair may also be configured by combining procedures of two following steps. Specifically, one of the procedures of the two steps is a procedure (i.e., a UE transmission beam selecting procedure) in which the UE transmits to the UE UL RSs corresponding to a plurality of UE transmission beams (i.e., UE Tx beams) and the corresponding base station selects and/or signals one of the plurality of UE transmission beams. Further, the remaining procedure is a procedure in which the UE repeatedly transmits the same UL RS corresponding to each UE transmission beam and the base station performs measurement for repeatedly transmitted signals by using different base station reception beams (i.e., TRP reception beams) and selects the base station reception beam according to the measurement.

In this case, when beam reciprocity is established between the DL beam and the UL beam, either the procedure for determining the DL beam pair or the procedure for determining the UL beam pair may be omitted. This may be similarly applied even to a case where beam correspondence is established. Here, establishing the beam reciprocity (or beam correspondence) may mean that it may be assumed that the base station transmission beam and the base station reception beam coincide with each other in communication between the base station and the UE and the UE transmission beam and the UE reception beam coincide with each other. Here, the base station transmission beam and the base station reception beam may mean the DL transmission beam and the DL reception beam, respectively and the UE transmission beam and the UE reception beam may mean the UL transmission beam and the UL reception beam, respectively.

The procedure for determining the DL beam pair and the procedure for determining the UL beam pair may be periodically or aperiodically performed. However, when the number of candidate beams is large, since RS overhead required for determining the beam pair may be large, it may be inefficient to frequently perform the procedures.

In this case, it may be assumed that the aforementioned period CSI reporting or semi-persistent CSI reporting is performed after the procedure for determining the DL beam pair and the procedure for determining the UL beam pair are completed.

In this case, CSI-RS (CSI-RS for CSI measurement of the UE) including a single or a plurality of antenna ports may be beamformed and transmitted through the base station transmission beam determined as the DL beam. In this case, a transmission period of the CSI-RS may be configured to be equal to or smaller than (i.e., so that CSI-RS transmission is more frequently performed than the CSI reporting) the CSI reporting period. Further, a method for transmitting the aperiodic CSI-RS according to the CSI reporting period or a method for configuring the aperiodic CSI-RS transmission to be performed more frequently than the CSI reporting may also be considered. Thereafter, the UE may periodically transmit the UE transmission beam (i.e., UL transmission beam) determined according to the procedure for determining the UL beam pair.

However, when a wireless channel environment is changed due to location movement of the UE, rotation of the UE, and/or movement of surrounding objects, a best DL beam pair and/or UL beam pair may be changed. For example, when a line of sight (LoS) environment is converted into a Non-LoS environment due to beam blocking, a best beam pair may be changed. In this case, performing a procedure of correcting the DL beam and/or UL beam every CSI reporting instance (timing) may be inefficient in terms of RS overhead and/or signaling overhead. In particular, the periodic (or semi-persistent) CSI reporting may be activated for rapid scheduling when a link is maintained and traffic occurs even in a case where there is no data traffic between the base station and the UE.

Considering the above points, it may not be desirable to frequently perform a procedure for determining the best beam pair in terms of power consumption of the UE and the base station. Accordingly, the procedure for determining the beam pair may be configured to be performed less frequently than the CSI reporting. In this case, the beams may be misaligned, and as a result, a communication quality becomes poor.

FIG. 8 illustrates an example of a beam staggering phenomenon related to periodic or semi-persistent CSI reporting. FIG. 8 is just for convenience of the description and does not limit the scope of the present invention.

Referring to FIG. 8, it is assumed that the base station and the UE perform a beam management procedure for determining the best beam pairs (i.e., the best DL beam pair and the best UL beam pair). Further, it is assumed that the beam reciprocity (or beam correspondence) between the DL beam and the UL beam is satisfied and the beams are misaligned as the UE rotates.

As illustrated in FIG. 8, when the beam management procedure (i.e., the procedure of determining the best beam pair) is configured to be longer than the CSI reporting period, the beams constituting the beam pair may be misaligned.

Specifically, in an interval 804, the UE may receive the CSI-RS transmitted from the base station by using the best beam pair determined through the beam management procedure 802 and transmit the CSI report. However, as in an interval 806, the beams constituting the beam pair may be misaligned due to the rotation of the UE, etc. Further, referring to an interval 808, a misalignment degree of the beams may become larger as time elapsed as compared with the interval 806.

As described above, when the best beam pairs determined through the beam management procedure are misaligned with each other through the rotation of the UE, etc., the communication quality between the base station and the UE may be degraded. Specifically, when the beam quality for the CSI reporting is degraded, Modulation and Coding Scheme (MCS) degradation (e.g., CQI degradation) in DL adaptation may occur and the CSI feedback information itself may not be delivered to the base station. In this case, a separate beam recovery procedure and/or link recovery procedure may be required. The separate procedures may generally cause problems including power consumption depending on signaling of the base station and/or the UE and communication disconnection and latency (delay) until recovery.

Hereinafter, in this specification, methods for solving the problems which may occur when the UE performs the periodic (or semi-persistent) CSI reporting will be described. Specifically, proposed is a method for maintaining a link quality (or channel quality or beam quality) between the base station and the UE without performing an additional beam procedure (i.e., the procedure of determining the best beam pair) during the periodic (or semi-persistent) CSI reporting.

Further, the method described in this specification may be applied even to other UL control information (e.g., HARQ-ACK information, information for a scheduling request (SR), information for beam failure recovery, etc.) in addition to the CSI reporting, of course.

Further, the embodiments described hereinbelow are just distinguished for convenience of the description and some configurations or features of a predetermined embodiment may be included in other embodiments or may be replaced with corresponding configurations or features of other embodiments. For example, hereinafter, a scheme to be described in the first embodiment may be applied to a scheme(s) to be described in a second embodiment and/or a third embodiment and vice versa.

First Embodiment—Method for Changing Number of Beams for UL Channel Transmission First, a method in which the UE sweeping a UL channel (e.g., PUCCH) may be considered. In other words, a method in which the UE dividedly or repeatedly transmits UL control information through a plurality of beams may be considered.

FIG. 9 illustrates an example of a method for transmitting UL control information via a plurality of beams to which the method proposed in this specification may be applied. FIG. 9 is just for convenience of the description and does not limit the scope of the present invention.

Referring to FIG. 9, it is assumed that the base station and the UE perform the periodic (or semi-persistent) CSI reporting procedure by determining the best beam pair through a beam management procedure 902 as illustrated above in FIG. 8.

In addition, the UE may be configured to transmit UL channels over a single beam or a plurality of beams, depending on whether a pre-configured condition is met with respect to the application of the plurality of beams.

Intervals 904 and 906 may correspond to the intervals 804 and 806 described above in FIG. 8. That is, in the interval 904, the UE may receive the CSI-RS using the reception beam according to the configured best beam pair and report the CSI using the transmission beam according to the best beam pair.

On the other hand, in the case of the interval 906, the UE beam used in the interval 904 is misaligned with the base station beam by the rotation of the UE. However, even in this case, the UE reports the CSI using the single beam as it is, because a pre-configured condition (e.g., when the link quality is measured below a threshold) is not met.

Thereafter, when the pre-configured condition is met as the rotation of the UE further progresses, the UE may report the CSI using the plurality of beams as shown in the interval 908.

As described above, since the UE reports the CSI using the plurality of beams, it is possible to prevent the loss of the CSI report message that may be caused by the beam misalignment and a probability that an unnecessary beam recovery procedure (or link recovery procedure) will be performed may be lowered.

Hereinafter, detailed contents of a method for transmitting the UL channel by using the single beam or the plurality of beams, that is, changing the number of applied beams for UL channel transmission will be described.

For example, when the UE performs the periodic or semi-persistent CSI reporting, if the measured link quality level is lowered using the DL RS (i.e., by the DL RS), the UE may increase the number of UL transmission beams used for the UL channel (e.g., PUCCH) for the CSI reporting. In this case, a predetermined-level value (i.e., a threshold or a pre-configured-level value) may be used for the UE to judge (or determine) that the ink quality level is lowered. Here, the link quality (i.e., measurement information) measured by using the DL RS may be at least one of the following information.

Channel Quality Indicator (CQI) information measured for CSI reporting
  CQI information measured by assuming that DL transmission RI is regardless of rank indicator (RI) measured for CSI reporting
  Received power information (e.g., Reference Signal Received Power (RSRP), etc.) for DL RS
  Received quality information (e.g., Reference Signal Received Quality (RSRQ), etc.) for DL RS In this case, the method in which the UE applies the plurality of beams for UL channel transmission may be described below.

As an example, the UE may be configured to apply the single beam for PUCCH transmission when the link quality is higher than a predetermined level and apply the plurality of beams for PUCCH transmission when link quality is equal to or lower than the predetermined level. In other words, depending on whether the measured link quality meets a pre-configured condition (or value), the UE may transmit the PUCCH via the single beam or the plurality of beams.

Alternatively, a method for gradually increasing the number of beams used for PUCCH transmission whenever a link quality interval is reduced by multiplexing a predetermined level (i.e., threshold) for the link quality may also be considered. In other words, the UE may stepwise change (i.e., decrease or increase) the number of beams or the beam set to be used for PUCCH transmission, according to a plurality of thresholds pre-configured for the link quality.

For example, there may be a plurality of sets of the same number of beams, such as beam set A constituted by beams of beam forming directions which are relatively adjacent and beam set B constituted by beams of beam forming directions which are relatively far. In this case, the UE may be configured to apply beam set A when the link quality is excellent (i.e., when the link quality is equal to or higher than a predetermined level) and to apply beam set B when the link quality is not excellent. The beam sets may be determined by the UE or pre-configured by the base station.

In this specification, the UL control channel for the CSI reporting is referred to as PUCCH. However, this is just for convenience of description and the aforementioned may be applied even to a physical channel (e.g., PUSCH) configured for arbitrary CSI reporting, of course.

In the aforementioned method, the UE may determine the number of beams or the beam set used for the PUCCH transmission according to the measured link quality. This is to enhance the reliability of CSI feedback information delivery when the link quality is degraded. However, the UE may determine the number of beams or the beam set to be used for PUCCH transmission according to the importance (or type) of the feedback information as well as the link quality.

For example, the UE may determine (or change) the number of UL transmission beams or the beam set used for UL channels (e.g., PUCCH, PUSCH) for the CSI reporting according to the CSI reporting information. Specifically, when the UE transmits information that needs to be delivered to the base station with relatively high reliability, the UE may transmit the PUCCH using the plurality of beams. Here, the information may include an RI, a beam index, a CSI-RS resource indicator (CRI), and the like.

Unlike this, when the UE transmits relatively low importance information, the UE may transmit the PUCCH using the single beam. Here, the information may include a Precoding Matrix Indicator (PMI), a CQI, explicit feedback information (e.g., a channel covariance matrix, an eigenvector/value, a channel coefficient, and the like.

In addition, in association with the PUCCH to which the single beam is applied and the PUCCH to which the plurality of beams are applied, N beams are may be determined for a plurality of PUCCH resources (or symbol groups) repeatedly transmitted N times in one slot (or subframe), respectively. In this case, the PUCCH to which the single beam is applied and the PUCCH to which the plurality of beams are applied may be distinguished according to whether the same beam is configured (or indicated, applied) or different beams are configured for N beams.

As an example, the spatial_relation_info field described above may be configured or indicated for each of the plurality of PUCCH resources that are repeatedly transmitted in one slot. In this case, the PUCCH to which the single beam is applied and the PUCCH to which the plurality of beams are applied may be distinguished according to whether the same spatial_relation_info value is applied to all of the plurality of PUCCH resources. Alternatively, the PUCCH to which the single beam is applied and the PUCCH to which the plurality of beams are applied may be distinguished according to whether the spatial_relation_info value is configured to be the same or different for each PUCCH symbol group of one PUCCH resource transmitted in one slot.

In addition, the PUSCH to which the single beam is applied and the PUSCH to which the plurality of beams are applied may be distinguished according to whether the repetitive transmission is performed in units of the symbol group and the same SRI value is applied to different symbol groups.

Further, as mentioned above, a method for determining the number of beams or the beam set to be used by the UE according to the importance of information may be applied not only to the CSI but also to other UL control information. For example, the UE may perform transmission using a different number of beam(s) for HARQ-ACK information, CSI, SR, and information related to beam failure recovery.

Specifically, the number of beams and/or the beam set may be configured differently according to the PUCCH format. Particularly, in the case of the PUCCH format for transmitting information having a high priority but having a small amount of information such as SR and ACK/NACK, different beams may be configured to be applied while repeatedly transmitting the PUCCHs in the slot. Unlike this, in the case of the PUCCH format for transmitting information having a large amount of information and a low priority such as CSI information, the PUCCH may not be repeatedly transmitted in the slot or the same beam may be applied while allowing repeated transmission.

In the case of the method in which the UE transmits the UL channel (e.g., PUCCH) using the plurality of beams (e.g., the plurality of beams-based PUCCH transmission) as described above, the UE may select the UE transmission beam according to three following methods.

First, a method in which the UE selects an arbitrary beam set (i.e., one or more beams) may be considered. In this case, it is assumed that the base station may not recognize the beam set selected by the UE. Alternatively, a method may be considered, in which the beam set to be applied to some of the PUCCH resources (i.e., resources allocated for the PUCCH transmission) may be pre-defined (or promised or configured) between the base station and the UE and the remaining beam set may be arbitrarily selected by the UE. Alternatively, a method may be considered, in which the beam set to be used for the PUCCH transmission may be pre-configured (or specified) or designated by the base station.

However, a second method and a third method may be valid when the radio channel between the base station and the UE is not changed rapidly with time unlike the first method. In other words, in the case of the second method and the third method, the interval between the CSI reporting instances may be configured shorter.

As a specific example of the third method, it is assumed that N (N≥1) spatial_relation_info field(s) are configured through the RRC message for the PUCCH resource. In this case, when one of the entities is indicated through the MAC message, a plurality of beams may be configured to be indicated by indicating a plurality of entities by the MAC message. In addition/alternatively, even when a plurality of (i.e., N>1) beams are configured by the RRC message, the PUCCH may be configured to be transmitted by using all of the corresponding beams without receiving the MAC message.

In this case, the UE may be configured to reuse some of the transmission beams used for the previous CSI transmission. Specifically, when the UE increases the number of beams for PUCCH transmission at a specific reporting instance during the periodic (or semi-persistent) CSI reporting, the UE may use best UE Tx beam(s) at the immediately previous (i.e., immediate preceding) CSI reporting instance in some or all time/frequency resources pre-configured for the PUCCH transmission.

For example, the UE may be configured to perform the CSI reporting using the single beam at the previous reporting instance and to perform the CSI reporting using a plurality of beams (e.g., two beams) at a next reporting instance. In this case, the beam used at the previous reporting instance may be applied (or allocated) to some pre-configured resources among resources (e.g., symbols) for the PUCCH transmission and the remaining beam(s) may be applied to the remaining resources. Here, the remaining beam(s) may be a beam(s) arbitrarily selected by the UE or indicated or pre-configured by the base station. In this case, an added beam(s) may be constituted by beams having a direction similar to the beam used at the previous reporting instance (i.e., transmission direction).

Alternatively, when the UE knows N best transmission beams in the process of determining the DL beam pair and/or the UL beam pair, the UE may select and use the best transmission beams in a pre-configured (or promised) symbol set according to the number of transmission beams. The N best transmission beams may be N beams selected or reported by the UE or N beams designated by the base station. As an example for the symbol which is pre-configured, transmission reliability may be different for each symbol set by a degree of proximity between the PUCCH DMRS symbol and the corresponding symbol group. Therefore, the best beam, a second best beam, and a third best beam may be configured according to a proximity order.

In this case, the UE may sequentially select the set of symbols configured in an alignment order according to the beam quality.

In the case of the method for determining the number of beams used for transmission of UL channels (e.g., PUCCH) according to the link quality described above, the UE determines whether to transmit the UL channels via the plurality of beams (e.g., whether to apply a plurality of PUCCH beams). However, a method for indicating whether the base station transmits the UL channel through the plurality of beams, the number of beams to be used for UL channel transmission, and/or an index of a beam (or a beam group) may also be considered. In this case, the base station may deliver the indication information to the UE via the physical layer signaling and/or the higher layer signaling.

When the physical layer signaling is used, the indication information may be delivered in a Downlink Control Information (DCI) form. Unlike this, when the higher layer signaling is used, the indication information may be delivered in a form such as Medium Access Control-Control Element (MAC-CE), Radio Resource Control-Information Element (RRC-IE), etc. Further, when the indication information is configured as higher layer control information (e.g., MAC CE), the UE may additionally transmit to the base station ACK/NACK information for the indication information. In this case, when the NACK information is transmitted, the base station may retransmit the indication information.

Further, in the aforementioned methods, the transmission period and/or the time offset for the plurality of beams-based UL channel transmission may be configured apart from the transmission period and/or time offset for the single beam based UL channel transmission. For example, a method may be considered in which two PUCCH resources for the CSI reporting are configured, one PUCCH resource is transmitted by applying the single beam, and the other PUCCH resource is transmitted by applying the plurality of beams. Alternatively, a method may also be considered in which the transmission period and the time offset for the PUCCH transmission are configured to be the same and the plurality of beams-based PUCCH transmission is configured to be applied only in a specific period. As an example, when the PUCCH transmission resource is configured in a period of 5 milliseconds (msec), the UE may perform the plurality of beams-based PUCCH transmission once every four times, that is, every 20 msec and perform the single beam-based PUCCH transmission at the remaining transmission instances.

It is needless to say that the beams for the UL channel transmission are distinguished into only the single beam and the plurality of beams, i.e., two cases for convenience of description and the aforementioned method may be even to a case where the beams for the UL channel transmission are distinguished into three or more cases. For example, $N_1$ beam PUCCH transmission mode, $N_2$ beam PUCCH transmission mode, . . . , $N_k$ beam PUCCH transmission mode may be separately configured or configured with different periods (or offsets) in a single configuration.

In addition, the aforementioned methods have been described with reference to applying different beams in one slot for convenience of description in performing the UL channel transmission by applying different beams, but different beams may be applied over a plurality of slots. For example, the proposed schemes may be applied as a criterion for determining whether the same beam is applied to the periodic or semi-persistent PUCCH resource configured at a short period every transmission instance (slot) or whether the transmission is performed while changing the beam. In this case, when indicating/configuring the beam set, the beam set may be defined as a beam set applied over the plurality of slots. As an example, N symbol groups may be defined (or configured) for each slot and when the beam set is applied in units of M slots, a total of N×M beams may be defined (or configured, indicated, applied).

Further, in the aforementioned methods, it is assumed that when the UE performs the plurality of beams-based UL channel transmission, the UL channel reception beam (e.g., PUCCH reception beam) of the base station is fixed. However, since the best reception beam of the base station may be different according to the transmission beam of the UE, the base station may also be configured to use a plurality of reception beams for UL channel reception.

As an example, when the base station designates the beam set (i.e., PUCCH transmission beam set) for PUCCH transmission of the UE, the base station may sequentially change the PUCCH beams to best PUCCH reception beams for each PUCCH transmission beam and receive the best PUCCH reception beams. Alternatively, in this case, the base station may receive the PUCCH simultaneously by configuring a composite beam to the corresponding reception beam group. With regard to the method of configuring and receiving the composite beam, when the base station has a plurality of Transmission and Reception Point (TXRUs) or panels, the base station may receive the PUCCH simultaneously by differently configuring the reception beam of each TXRU or panel. Alternatively, the base station may simultaneously receive the PUCCH simultaneously by using beams (i.e., a beam having an extended beam width) in two directions by compositing reception beam coefficients.

Unlike this, when the base station does not designate the beam set for the PUCCH transmission of the UE, if a specific case is satisfied, the base station may be configured (or specified) to apply a plurality of PUCCH reception beams. Here, the specific condition may be a case where the base station fails in the previous PUCCH reception, a case where a reception sensitivity of the PUCCH which is previously received is equal to or less than a predetermined value, a case where feedback information (e.g., DL feedback information) such as CQI or RSRP previously reported by the UE is equal to or less than a predetermined value, or a case where the quality of another UL signal (e.g., PUCCH, sounding reference signal (SRS)) previously received by the base station is equal to or less than a predetermined value. Further, when the specific condition is met, the base station may indicate the increase in PUCCH transmission power to the UE.

Based on the aforementioned methods, the UE may deliver the UL control information (e.g., CSI) by using the single beam or the plurality of beams for a situation thereof.

Second Embodiment—UL RS Based UL Beam Refinement Method

In this case, when the UE performs the UL channel transmission by using the plurality of beams by means of the aforementioned methods, the base station may perform UL beam refinement by using the reference signal (RS) transmitted through the corresponding UL channel.

Specifically, the base station may compare an RS signal quality corresponding to each UE transmission beam (i.e., UL transmission beam) using the RS (e.g., PUCCH DMRS) used for UL channel demodulation. Accordingly, the base station may provide RS resource index information and/or RS quality information to the UE according to the comparison result. For example, the RS resource index information may include index(es) of the resource and/or port for the best PUCCH DMRS and the RS quality information may include reference signal received power (RSRP), reference signal received quality (RSRQ), and the like. In other words, the base station may perform measurements using UL RSs transmitted via a plurality of UE UL transmission beams and then indicate a beam(s) suitable for subsequent UL transmission or DL reception of the UE through RS-related information.

Hereinafter, operations of the UE and the base station, which are related to an uplink beam refinement method based on the uplink reference signal will be described in detail.

First, the UE that receives the information (i.e., RS resource index information and/or RS quality information) from the base station may perform at least one of two following operations. The UE may use UL transmission beam(s) mapped to RS resource index information or UL transmission beam(s) corresponding to a high RS quality for subsequent UL transmission. Alternatively, the UE may receive a DL signal through a UL transmission beam(s) mapped to RS resource index information or a DL signal through a DL reception beam(s) corresponding to a UL transmission beam(s) corresponding to a high RS quality. In this case, it is assumed that DL/UL beam correspondence is established for the corresponding UE.

Next, the base station that transmits the information (i.e., RS resource index information and/or RS quality information) to the UE may perform at least one of two following operations. The base station may use a UL transmission beam(s) mapped to the RS resource index information or a UL reception beam(s) paired with a UL transmission beam(s) corresponding to the high RS quality for subsequent UL reception. Alternatively, the base station may transmit a subsequent DL signal through a UL transmission beam(s) mapped to the RS resource index information or a DL transmission beam(s) corresponding with a UL reception beam(s) paired with the UL transmission beam(s) corresponding to the high RS quality. In this case, it is assumed that the DL/UL beam correspondence is established for the corresponding base station.

Here, the paired beam may mean a beam mapped to optimize the transmission/reception performance of the signal. That is, the base station UL reception beam paired with the UE UL transmission beam may mean a base station reception beam mapped to optimize the reception performance for the UE transmission beam. When the base station and the UE share such beam pair information (i.e., relationship information between the paired beams), the UE that receives the RS resource index information or RS quality information may not need a separate indication for a beam to be used in a subsequent transmission/reception procedure. In this case, even if there is no separate indication, the UE may perform transmission/reception by assuming that the beam of the base station is changed to the base station transmission/reception beam paired with the UE transmission/reception beam inferred from the corresponding RS resource index information or RS quality information in the subsequent transmission/reception procedure.

Further, in the UL beam refinement procedure, so that the base station may determine whether the UE applies the plurality of beams to the UL channel transmission and beam information (e.g., the number of beams, a beam index, etc.) when applying the plurality of beams to the UL channel transmission, a process in which the corresponding UE delivers the information to the base station may be additionally required. Such information may be included in the UCI together with the CSI feedback information or delivered through a separate UL physical channel other than a physical channel that transmits the CSI feedback. Alternatively, the UE may deliver such information through the higher layer message (e.g., RRC message, MAC-CE, etc.) in addition to the physical layer message.

Alternatively, a method may also be considered in which a parameter of the UL RS (e.g., PUCCH DMRS) transmitted together with the UL channel is configured differently according to whether to apply the plurality of beams and/or information of the applied beam to allow the base station to determine the information. Here, the parameter of the UL RS may include a time and/or frequency resource position, a sequence applied to the UL RS, and the like.

For example, when a Zadoff-Chu sequence is used in the UL RS, a root index or a cyclic shift may be applied differently depending on whether sweeping is applied. Alternatively, when a Pseudo-Random sequence is used in the UL RS, a scrambling seed or an Orthogonal Cover Code (OCC) may be applied differently according to whether sweeping is applied. Here, whether sweeping is applied may mean whether the UE uses the plurality of beams in order to transmit the UL channel.

In this case, the base station may determine sweeping ON or sweeping OFF through a blind detection scheme of applying (all) parameters corresponding to the sweeping ON and the sweeping OFF. Here, the sweeping ON may mean a case where the sweeping is applied and the sweeping OFF may mean a case where the sweeping is not applied.

Alternatively, a method for delivering whether sweeping related to the UL channel transmission is applied and/or the number of beams through masking for a Cyclic Redundancy Check bit which is a PUCCH error detecting code may also be considered. In the case of the corresponding method, the same scheme as a scheme of delivering information on the number of CRS ports through CRS masking of the PBCH may be applied.

Each of the aforementioned methods may be independently used and a plurality of methods may be together used. For example, whether the sweeping is applied (i.e., whether beam sweeping is applied) may be delivered through a separate physical channel as 1-bit information and beam index related information for the applied beam may be included in the UCI and delivered through the PUCCH.

FIG. 10 illustrates another example of a method for transmitting UL control information via a plurality of beams to which the method proposed in this specification may be applied. FIG. 10 is just for convenience of the description and does not limit the scope of the present invention.

Referring to FIG. 10, a beam management procedure 1002 and intervals 1004 to 1008 are the same as the beam management procedure 902 and the intervals 904 to 908 of FIG. 9 described above, and as a result, a detailed description thereof will be omitted.

In the case of the method illustrated in FIG. 10, the UE senses that the link quality falls to a pre-configured level or less in third CSI reporting after the beam pair is determined through the beam management procedure 1002. As a result, the corresponding UE may perform PUCCH sweeping for the third CSI reporting. That is, the corresponding UE may perform the third CSI reporting through the plurality of UL beams.

In this case, the base station recognizes the PUCCH sweeping compares signal qualities for PUCCH DMRS resources corresponding to respective UE transmission beams to provide information on a comparison result to the UE. Therefore, the base station may perform DMRS based UL beam refinement of the UL control channel (i.e., PUCCH) (step 1010). The UE that receives the information on the comparison result may change a UL transmission beam for subsequent UL transmission and/or a DL reception beam for subsequent DL reception to a beam corresponding to a PUCCH DMRS resource having an excellent quality.

Through the aforementioned procedures, the beam refinement procedure is not separately performed, but the UE performs beam refinement between the corresponding UE and the base station by using the UL RS (e.g., PUCCH DMRS) of the UL channel through the plurality of beams, and as a result, beam management overhead may be reduced.

Alternatively, when the plurality of beams are transmitted in PUCCH transmission by the configuration or indication of the base station, the resource or RS may be indexed for each unit (e.g., symbol group) to change the beam and then, the base station may indicate a beam which the UE is to use for subsequent UL transmission and/or DL reception based on the indexed resource or RS.

Third Embodiment—Configuration of UL Control Channel Beam Based on UL/DL Data Beam Indication In the first embodiment described above, a method is proposed in which the UE determines degradation for a beam quality in the periodic or semi-persistent CSI reporting to use the plurality of beams for transmitting the UL control channel (e.g., PUCCH). In the middle of such a periodic or semi-persistent CSI reporting timing (or instance), a case may occur in which the beam management procedure according to a specific situation is performed. For example, before a next reporting timing after the UE performs the CSI reporting, DL or UL data traffic for the corresponding UE occurs, and as a result, the beam management procedure may be performed. Here, the beam management procedure may mean a procedure of determining the best beam pair between the UE and the base station.

As described above, when there is a direct (or indirect) indication of the base station for the UL beam or DL beam in the middle of the CSI reporting of the UE, a method for correcting the UL beam for the UL control channel may be considered according to the corresponding indication. For example, when the UE receives the indication for the UL/DL beam in the middle of the CSI reporting, the corresponding UE may refine the UL beam for PUCCH reporting based on the indication.

An example of a detailed method related thereto may be as follows.

In the middle of each CSI reporting instance in which the UE is configured to report periodically (or semi-persistently), there may be an indication for a beam (i.e., PUSCH transmission beam for UL data or a beam (i.e., PDSCH reception beam) for DL data. In other words, a case in which the UE receives beam indication information indicating the beam for the UL data and/or the beam for the DL data in the middle of the CSI reporting may occur.

In this case, the UE may configure a transmission beam (i.e., PUCCH reporting transmission beam) for subsequent (or pre-configured) periodic CSI reporting by considering the indicated beam as described above. In particular, the UE may configure the indicated beam as the PUCCH reporting transmission beam. In this case, in the case of the beam for the DL data, it is assumed that beam reciprocity or beam correspondence is established for the corresponding UE.

In addition, the base station that performs the indication may change the PUCCH reception beam for the periodic (or semi-persistent) CSI feedback of the corresponding UE to the PUSCH reception beam or the PDSCH transmission beam after the corresponding timing.

Here, the beam indication information (i.e., information indicating the beam for the UL data or the beam for the DL data) may be delivered via the physical layer signaling or higher layer signaling. For example, the UE may receive the beam indication information by using the DCI delivered through the PDCCH or receive the beam indication information through the higher layer message (e.g., RRC message, MAC-CE). When the beam indication information is transmitted through the DCI, the beam indication information may be signaled together with a UL grant (e.g., PUSCH resource allocation information) or a DL grant (e.g., PUSCH resource allocation information).

The beam information for the UL data may be configured in a form such as a beam ID or an RS resource index for UL beam measurement. Here, the RS for UL beam measurement may include an SRS, a UL DMRS, and the like. Further, the beam information may directly indicate the UL transmission beam, but indirectly indicate information on the UL reception beam associated with the UL transmission beam.

For example, a flag may be configure to indicate whether to apply the SRI field used in the PUSCH beam indication even to the subsequent PUCCH beam. In this case, when the UE receives a UL-related DCI of a form in which the corresponding flag is ON while holding the separately indicated PUCCH beam through both the RRC message or both the RRC and MAC messages, the corresponding UE may change the SRI value to an SRI value to indicate the subsequent PUCCH beam to be applied to the corresponding PUSCH and apply the SRI value.

Further, the beam information for the UL data may also be configured in a form such as the beam ID or the RS resource index for DL beam measurement. Here, the RS for the DL beam measurement may include the CSI-RS, the DL DMRS, and the like. Even in this case, the beam information may directly indicate the DL reception beam, but indirectly indicate information on the DL reception beam associated with the DL reception beam.

In particular, in the case of indicting the UE reception beam, the beam may be indirectly indicated through signaling for Quasi-Co-Location (QCL) between different antenna ports. Further, a UE in which the DL/UL beam correspondence is established may determine the UL transmission beam by using the DL reception beam information. As an example, the base station may announce which beam is used for the DL data transmission through signaling for a QCL relationship between a CSI-RS antenna port(s) (or CSI-RS resource) corresponding to the base station transmission beam and the DL DMRS (i.e., UE-specific RS) port(s).

In this regard, in the NR system, a QCL framework may be extended with a new spatial QCL parameter(s) in order to support a UE-side beamforming or receiving procedure. Further, in the case of the downlink of the NR system, a beam management procedure with or without a beam related indication may be supported. In particular, when the beam-related indication is provided, information related to the UE-side beamforming or receiving procedure used for data reception may be indicated to the UE through the QCL.

Further, in the NR system, a transmission configuration indicator (TCI) field included in a DL related DCI serves to dynamically indicate one of candidates of a plurality of QCL reference resources (e.g., CSI-RS resources or SSB resources) configured in the higher layer (similarly to a PQI field of LTE).

Here, the QCL indication may include a QCL indication for the spatial parameter. For example, it may be indicated by which DL RS beam the corresponding PDSCH is transmitted through the TCI field among a plurality of DL RS resources configured in the higher layer. The UE that receives the indication may receive a corresponding PDSCH beam by applying a reception beam previously trained to be suitable for receiving the corresponding DL RS.

In this regard, the method described in this specification may be used to add the flag to the DL-related DCI that performs PDSCH resource allocation to indicate to the subsequent PUCCH whether to apply the transmission beam corresponding to the PDSCH reception beam.

Specifically, when the proposed flag is ON, the UE may configure the uplink transmission beam to be applied as a transmission beam corresponding to the reception beam for the DL RS indicated in the TCI field at the time of transmission for the subsequent UL channel.

In this case, when the TCI field does not exist in the DCI in association with the PDSCH beam indication, a specific state (e.g., the lowest index state) pre-promised among the plurality of TCI states configured in the higher layer may be applied as the TCI field value. Alternatively, the TCI value configured for the PDCCH transmission may be applied to the PDSCH reception as it is.

Even in this case, when the flag is added to the DL-related DCI and the corresponding flag is ON, the UE may be configured to apply the uplink transmission beam to be applied at the time of transmitting the subsequent UL channel as the transmission beam corresponding to the reception beam for the DL RS indicated by the corresponding TCI value (e.g., a lowest index state or a TCI state for the PDCCH).

A method may be considered in which when TCI values corresponding to a plurality of PDCCHs (or a core set, a search space) are configured in association with the beam indication for the PDCCH, a TCI value corresponding to the PDCCH indicating the corresponding scheduling is configured to be applied. Alternatively, a method may be considered in which a TCI value (e.g., a core set of the lowest index) corresponding to a predetermined PDCCH according to a specific rule is configured to be applied. Alternatively, a method may be considered in which the TCI value corresponding to the PDCCH previously configured (or indicated) separately for the UE is configured to be applied.

FIG. 11 illustrates an operation flowchart of a user equipment which transmits an uplink channel in a wireless communication system to which the method proposed in this specification may be applied. FIG. 11 is just for convenience of the description and does not limit the scope of the present invention.

In step S1105, the UE receives a specific reference signal (e.g., CSI-RS) from the base station.

In step S1110, the UE may determine the number of beams to transmit the uplink control channel reporting the uplink control information (e.g., channel state information (CSI)) generated based on the received specific reference signal. In this case, the UE may determine the number of beams to transmit the uplink control channel (e.g., PUCCH) through the methods described in the above embodiments. For example, the UE may determine whether to apply the beam sweeping for transmission of the uplink control channel. In this case, the number of the beams may be determined based on at least one of the measurement information (e.g., link quality) by the DL RS received from the base station or the type of uplink control information (e.g., importance and/or reliability of the feedback information).

In step S1115, the UE transmits, to the base station, the uplink control channel via a single beam or a plurality of beams.

In this case, when a value represented by the measurement information is smaller than a pre-configured threshold, the uplink control channel may be transmitted via the plurality of beams. Here, the pre-configured threshold may be configured differently according to the number of beams of the plurality of beams. Further, the downlink reference signal may include the CS-RS and the measurement information may include at least one of a channel quality indicator (CQI), received power information (e.g., RSRP), or received quality information (e.g., RSRQ).

In addition, when the uplink control information includes information representing at least one of a rank indicator or a beam index (or a beam ID), the uplink control channel may be transmitted via the plurality of beams.

Further, when the UE transmits the uplink control channel via the plurality of beams, the plurality of beams may include a specific beam used for reporting the uplink control information at a previous time. In this case, the specific beam may be allocated to a pre-configured specific resource among resources configured for transmitting the uplink control channel.

Further, when the UE transmits the uplink control channel via the plurality of beams, the plurality of beams may belong to one of a plurality of pre-configured beam sets.

Further, the UE may receive at least one of information representing whether to apply the plurality of beams, information representing the number of beams, or information representing an index of at least one beam to be used for transmitting the uplink control channel. That is, the corresponding UE may receive indication information for a beam to be used for transmission of the uplink control channel from the base station.

Further, the UE may receive, from the base station, beam configuration information related to transmission of the uplink control channel. In this case, the beam configuration information may include first beam configuration information for the single beam and second beam configuration information for the plurality of beams. Further, each of the first beam configuration information and the second beam configuration information may include at least one of resource information, time offset information, or period information related to the transmission of the uplink control channel.

Further, the UE may be configured to report the uplink control information periodically or semi-persistently. For example, when receiving beam indication information for an uplink shared channel (e.g., PUSCH) or a downlink shared channel (e.g., PDSCH) from the base station, the UE may transmit an uplink control channel for reporting subsequent channel state information by using a beam represented by the beam indication information at a subsequent reporting timing.

Further, when the UE transmits the uplink control channel via the plurality of beams, the UE may receive, from the base station, signal quality information related to the plurality of beams. In addition, the UE may transmit a subsequent uplink channel via at least one specific beam selected based on the received signal quality information.

Further, in this case, the UE may transmit, to the base station, information on at least one of whether to apply the plurality of beams for transmitting the uplink control channel or the number of beams.

Here, the signal quality information is determined based on a signal quality (i.e., RS signal quality) for each beam measured by a reference signal (e.g., UL DMRS) used for demodulating the uplink control channel. In this case, the signal quality information may include at least one of resource index information of the reference signal or received quality information for the reference signal.

Overview of Devices to which Present Invention is Applicable

FIG. 12 illustrates a block diagram of a wireless communication device to which methods proposed by this specification may be applied.

Referring to FIG. 12, a wireless communication system includes an eNB 1210 and multiple UEs 1210 positioned within an area of the eNB 1220.

The eNB 1210 includes a processor 1211, a memory 1212, and a radio frequency (RF) unit 1213. The processor 1211 implements a function, a process, and/or a method which are proposed in FIGS. 1 to 11 above. The layers of the wireless interface protocol may be implemented by the processor 1211. The memory 1212 is connected with the processor 1211 to store various pieces of information for driving the processor 1211. The RF unit 1213 is connected with the processor 1211 to transmit and/or receive a radio signal.

The UE 1220 includes a processor 1221, a memory 1222, and an RF unit 1223.

The processor 1221 implements a function, a process, and/or a method which are proposed in FIGS. 1 to 11 above. The layers of the wireless interface protocol may be implemented by the processor 1221. The memory 1222 is connected with the processor 1221 to store various pieces of information for driving the processor 1221. The RF unit 1223 is connected with the processor 1221 to transmit and/or receive a radio signal.

The memories 1212 and 1222 may be positioned inside or outside the processors 1211 and 1221 and connected with the processors 1211 and 1221 by various well-known means. Further, the base station 1210 and/or the UE 1220 may have a single antenna or multiple antennas.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

INDUSTRIAL APPLICABILITY

Although a scheme of transmitting an uplink channel in a wireless communication system of the present invention has been described with reference to an example applied to a 3GPP LTE/LTE-A system or a 5G system (New RAT system), the scheme may be applied to various wireless communication systems in addition to the 3GPP LTE/LTE-A system or 5G system.

The invention claimed is:

1. A method for transmitting, by a user equipment (UE), an uplink control channel in a wireless communication system, the method comprising:
   receiving, from a base station via higher layer signaling, beam information for a transmission of the uplink control channel; and
   transmitting, to the base station, the uplink control channel, via at least one beam configured based on the beam information,
   wherein the beam information includes information for a pre-configured beam set including the at least one beam,
   wherein the at least one beam is related to a reference signal which is transmitted and received between the base station and the UE,
   wherein the at least one beam is based on a single beam or a plurality of beams in the pre-configured beam set,
   wherein the at least one beam is configured to be the plurality of beams in the pre-configured beam set based on a specific condition being satisfied, and
   wherein the specific condition is configured to be satisfied based on that a value represented by measurement information for the reference signal is smaller than a pre-configured threshold.

2. The method of claim 1, wherein the pre-configured threshold is configured differently according to the number of beams of the plurality of beams.

3. The method of claim 1, wherein the reference signal includes a CSI-RS, and
   wherein the measurement information includes at least one of a channel quality indicator, received power information, or received quality information.

4. The method of claim 1, wherein when the UE transmits the uplink control channel via a plurality of beams, the plurality of beams belongs to one of a plurality of pre-configured beam sets.

5. The method of claim 1, further comprising:
   receiving at least one of information representing whether to apply the at least one beam, information representing the number of beams, or information representing at least one beam index to be used for transmitting the uplink control channel.

6. The method of claim 1, further comprising:
   receiving, from the base station, beam configuration information related to transmission of the uplink control channel,
   wherein the beam configuration information includes first beam configuration information for a single beam and second beam configuration information for a plurality of beams, and
   wherein each of the first beam configuration information and the second beam configuration information includes at least one of resource information, time offset information, or period information related to the transmission of the uplink control channel.

7. The method of claim 1, wherein the UE is configured to report uplink control information periodically or semi-persistently, via the uplink control channel.

8. The method of claim 1, wherein the beam information includes beam index information for the at least one beam.

9. The method of claim 1, wherein the reference signal is a Channel State Information-Reference Signal (CSI-RS), and
   wherein the uplink control channel is transmitted through one or more pre-configured CSI reporting resources.

10. The method of claim 9, wherein a beam configuration for the transmission of the uplink control channel is configured for each of the one or more pre-configured CSI reporting resources.

11. The method of claim 1, wherein the number of the at least one beam is determined based on at least one of measurement information by the reference signal or a type of uplink control information transmitted via the uplink control channel.

12. A UE for transmitting an uplink control channel in a wireless communication system, the UE comprising:
   a Radio Frequency (RF) unit for transmitting and receiving a radio signal; and
   a processor functionally connected to the RF unit,
   wherein the processor is configured to:
   receive, from a base station via higher layer signaling, beam information for a transmission of the uplink control channel; and
   transmit, to the base station, the uplink control channel, via at least one beam configured based on the beam information,
   wherein the beam information includes information for a pre-configured beam set including the at least one beam,
   wherein the at least one beam is related to a reference signal which is transmitted and received between the base station and the UE,
   wherein the at least one beam is based on a single beam or a plurality of beams in the pre-configured beam set,
   wherein the at least one beam is configured to be the plurality of beams in the pre-configured beam set based on a specific condition being satisfied, and
   wherein the specific condition is satisfied based on that a value represented by measurement information for the reference signal is smaller than a pre-configured threshold.

13. A method for receiving, by a base station, an uplink control channel in a wireless communication system, the method comprising:
   transmitting, to a user equipment via higher layer signaling, beam information for a transmission of the uplink control channel; and
   receiving, from the user equipment, the uplink control channel, via at least one beam configured based on the beam information,
   wherein the beam information includes information for a pre-configured beam set including the at least one beam,
   wherein the at least one beam is related to a reference signal which is transmitted and received between the base station and the user equipment,
   wherein the at least one beam is based on a single beam or a plurality of beams in the pre-configured beam set,
   wherein the at least one beam is configured to be the plurality of beams in the pre-configured beam set based on a specific condition being satisfied, and
   wherein the specific condition is satisfied based on that a value represented by measurement information for the reference signal is smaller than a pre-configured threshold.

* * * * *